(12) United States Patent
Tsutsui

(10) Patent No.: US 9,167,620 B2
(45) Date of Patent: Oct. 20, 2015

(54) BASE STATION, SERVICE PROVIDING DEVICE, USER EQUIPMENT, MOBILE COMMUNICATION SYSTEM, AND COMMUNICATION CONTROL METHOD THEREFOR

(75) Inventor: Takahiro Tsutsui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 228 days.

(21) Appl. No.: 13/814,646

(22) PCT Filed: May 31, 2011

(86) PCT No.: PCT/JP2011/003064
§ 371 (c)(1),
(2), (4) Date: Feb. 6, 2013

(87) PCT Pub. No.: WO2012/026053
PCT Pub. Date: Mar. 1, 2012

(65) Prior Publication Data
US 2013/0143624 A1 Jun. 6, 2013

(30) Foreign Application Priority Data
Aug. 25, 2010 (JP) .................................. 2010-188546

(51) Int. Cl.
*H04W 24/10* (2009.01)
*H04W 88/00* (2009.01)
(Continued)

(52) U.S. Cl.
CPC ................ *H04W 88/00* (2013.01); *H04W 4/20* (2013.01); *H04W 64/00* (2013.01); *H04W 88/02* (2013.01); *H04W 4/02* (2013.01); *H04W 24/10* (2013.01)

(58) Field of Classification Search
CPC .................................................... H04W 24/10

USPC ......................................................... 455/423
See application file for complete search history.

(56) References Cited

U.S. PATENT DOCUMENTS

2006/0293066 A1  12/2006 Edge et al.
2008/0062913 A1* 3/2008 Zander et al. ................. 370/320
(Continued)

FOREIGN PATENT DOCUMENTS

JP  2007-006229 A  1/2007
JP  2009-513036 A  3/2009
(Continued)

OTHER PUBLICATIONS

Office Action dated Dec. 10, 2013, issued by the Japanese Patent Office in counterpart Japanese Application No. 2012-530506.
(Continued)

*Primary Examiner* — Wen Huang
(74) *Attorney, Agent, or Firm* — Sughrue Mion, PLLC

(57) ABSTRACT

In order to improve utilization efficiency of communication resources in a case of acquiring a reception status at a user equipment of a radio signal upon providing LCS, an E-SMLC (40) forming a mobile communication system requests an eNB (10) to notify a result of measurement on a reception status at a UE (20) of a radio signal at least from the eNB (10) for a predetermined number of times. The E-SMLC (40) calculates a location of the UE (20) using the result of the measurement when the notification is performed for the number of times, and provides a service corresponding to the location. In response to the request, the eNB (10) instructs the UE (20) to perform the measurement for the number of times and sequentially notifies the E-SMLC (40) of the result of the measurement reported from the UE (20) for the number of times. The UE (20) performs measurement on the reception status for the number of times and sequentially notifies the eNB (10) of the result of the measurement for the number of times.

9 Claims, 27 Drawing Sheets

(51) Int. Cl.
*H04W 4/20* (2009.01)
*H04W 64/00* (2009.01)
*H04W 88/02* (2009.01)
*H04W 4/02* (2009.01)

(56) References Cited

U.S. PATENT DOCUMENTS

| | | | |
|---|---|---|---|
| 2008/0160918 | A1 | 7/2008 | Jeong et al. |
| 2009/0005029 | A1* | 1/2009 | Wang et al. ............... 455/423 |
| 2009/0005119 | A1* | 1/2009 | Patel et al. ............... 455/562.1 |
| 2010/0190488 | A1* | 7/2010 | Jung et al. ............... 455/424 |
| 2010/0208597 | A1* | 8/2010 | Chun et al. ............... 370/252 |
| 2011/0009067 | A1* | 1/2011 | Iwamura et al. ........... 455/67.11 |
| 2011/0081868 | A1* | 4/2011 | Kim et al. ............... 455/67.11 |
| 2011/0287767 | A1* | 11/2011 | Huang et al. ............. 455/436 |
| 2011/0317577 | A1* | 12/2011 | Yamada et al. ........... 370/252 |
| 2011/0319070 | A1* | 12/2011 | Nosley et al. ............ 455/422.1 |

FOREIGN PATENT DOCUMENTS

| | | |
|---|---|---|
| JP | 2010-512098 A | 4/2010 |
| JP | 2010-177951 A | 8/2010 |
| WO | 2009022835 A2 | 2/2009 |
| WO | 2010/073829 A1 | 10/2010 |

OTHER PUBLICATIONS

Communication dated Oct. 14, 2014 from the Japanese Patent Office in counterpart application No. 2014-018309.
3GPP TS 36.300, "Evolved Universal Terrestrial Radio Access (E-UTRA) and Evolved Universal Terrestrial Radio Access Network (E-UTRAN); Overall description", V9.2.0, Dec. 2009, Clause 4, pp. 17 to 27.
3GPP TS 36.331, "Evolved Universal Terrestrial Radio Acess (E-UTRA) Radio Resource Control (RRC); Protocol specification", V9.1.0, Dec. 2009, Clauses.3.5.1 to 5.3.5.3, 5.5.2, 5.5.3, 5.5.6, 6.2.2, and 6.3.5, pp. 40 to 42, 64 to 70, 76 to 79, 91 to 117, and 165 to 180.
3GPP TS 36.305 "Evolved Universal Terrestrial Radio Access Network (E-UTRAN); Stage 2 functional specification of User Equipment (UE) positioning in E-UTRAN", V9.1.0, Dec. 2009, Clause 5, pp. 11 to 15.
3GPP TS 36.455, "Evolved Universal Terrestrial Radio Access (E-UTRA); LTE Positioning Protocol A (LPPa)", V9.1.0, Mar. 2010, Clauses 8.2.1, 8.2.3, 8.2.4, 9.1.1.1, 9.1.1.2, 9.1.1.5, and 9.1.1.6, pp. 10 to 12 and 14 to 16.
International Search Report of PCT/JP2011/003064 dated Aug. 23, 2011.
Communication dated Jan. 4, 2015 from the State Intellectual Property Office of People's Republic of China in counterpart Application No. 201180038668.X.

* cited by examiner

BEFORE S12

| measId#1 | |
|---|---|
| | measObjectId#1 |
| | reportConfigId#1 |
| s-Measure(50) | |
| MeasGap(Release) | |
| measIdList | |
| | measObjectId#1 |
| reportConfigList | |
| | reportConfigId#1 |

Fig. 6A

AFTER S14

| measId#1 | |
|---|---|
| | measObjectId#1 |
| | reportConfigId#1 |
| measId#2 | |
| | measObjectId#2 |
| | reportConfigId#2 |
| s-Measure(50) | |
| MeasGap(Release) | |
| measIdList | |
| | measObjectId#1 |
| | measObjectId#2 |
| reportConfigList | |
| | reportConfigId#1 |
| | reportConfigId#2 |

Fig. 6B

AFTER S17

| measId#1 | |
| --- | --- |
| | measObjectId#1 |
| | reportConfigId#1 |
| s-Measure(50) | |
| MeasGap(Release) | |
| measIdList | |
| | measObjectId#1 |
| | measObjectId#2 |
| reportConfigList | |
| | reportConfigId#1 |
| | reportConfigId#2 |

Fig. 6C

BEFORE S22

| measId#1 | |
|---|---|
| | measObjectId#1 |
| | reportConfigId#1 |
| s-Measure(50) | |
| MeasGap(Release) | |
| measIdList | |
| | measObjectId#1 |
| reportConfigList | |
| | reportConfigId#1 |

Fig. 8A

AFTER S24

| measId#1 | |
|---|---|
| | measObjectId#1 |
| | reportConfigId#1 |
| measId#2 | |
| | measObjectId#2 |
| | reportConfigId#2 |
| s-Measure(50) | |
| MeasGap(Release) | |
| measIdList | |
| | measObjectId#1 |
| | measObjectId#2 |
| reportConfigList | |
| | reportConfigId#1 |
| | reportConfigId#2 |
| s-Measure Ignore Flag (measId#2) | |

Fig. 8B

BEFORE S32

| measId#1 | |
|---|---|
| | measObjectId#1 |
| | reportConfigId#1 |
| s-Measure (50) | |
| MeasGap (Release) | |
| measIdList | |
| | measObjectId#1 |
| reportConfigList | |
| | reportConfigId#1 |

Fig. 10A

AFTER S34

| measId#1 | |
|---|---|
| | measObjectId#1 |
| | reportConfigId#1 |
| measId#2 | |
| | measObjectId#2 |
| | reportConfigId#2 |
| s-Measure (50) | |
| MeasGap (Setup) | |
| measIdList | |
| | measObjectId#1 |
| | measObjectId#2 |
| reportConfigList | |
| | reportConfigId#1 |
| | reportConfigId#2 |
| MeasGap Release Flag (measId#2) | |

Fig. 10B

AFTER S29

| measId#1 | |
| --- | --- |
| | measObjectId#1 |
| | reportConfigId#1 |
| s-Measure(50) | |
| MeasGap(Release) | |
| measIdList | |
| | measObjectId#1 |
| | measObjectId#2 |
| reportConfigList | |
| | reportConfigId#1 |
| | reportConfigId#2 |

Fig. 10C

BEFORE S32

| measId#1 | |
|---|---|
| | measObjectId#1 |
| | reportConfigId#1 |
| s-Measure(50) | |
| MeasGap(Release) | |
| measIdList | |
| | measObjectId#1 |
| reportConfigList | |
| | reportConfigId#1 |

Fig. 12A

AFTER S34

| measId#1 | |
|---|---|
| | measObjectId#1 |
| | reportConfigId#1 |
| measId#2 | |
| | measObjectId#2 |
| | reportConfigId#2 |
| s-Measure(50) | |
| MeasGap(Setup) | |
| measIdList | |
| | measObjectId#1 |
| | measObjectId#2 |
| reportConfigList | |
| | reportConfigId#1 |
| | reportConfigId#2 |
| MeasGap Release Flag (measId#2) | |

Fig. 12B

AFTER S42

| measId#1 | |
|---|---|
| | measObjectId#1 |
| | reportConfigId#1 |
| measId#2 | |
| | measObjectId#2 |
| | reportConfigId#2 |
| measId#3 | |
| | measObjectId#3 |
| | reportConfigId#3 |
| s-Measure(50) | |
| MeasGap(Setup) | |
| measIdList | |
| | measObjectId#1 |
| | measObjectId#2 |
| | measObjectId#3 |
| reportConfigList | |
| | reportConfigId#1 |
| | reportConfigId#2 |
| | reportConfigId#3 |

Fig. 12C

AFTER S36

| measId#1 | |
|---|---|
| | measObjectId#1 |
| | reportConfigId#1 |
| measId#3 | |
| | measObjectId#3 |
| | reportConfigId#3 |
| s-Measure(50) | |
| MeasGap(Setup) | |
| measIdList | |
| | measObjectId#1 |
| | measObjectId#2 |
| | measObjectId#3 |
| reportConfigList | |
| | reportConfigId#1 |
| | reportConfigId#2 |
| | reportConfigId#3 |

Fig. 12D

BEFORE S52

| measId#1 | |
|---|---|
| | measObjectId#1 |
| | reportConfigId#1 |
| s-Measure(50) | |
| MeasGap(Release) | |
| measIdList | |
| | measObjectId#1 |
| reportConfigList | |
| | reportConfigId#1 |

Fig. 14A

AFTER S54

| measId#1 | |
|---|---|
| | measObjectId#1 |
| | reportConfigId#1 |
| measId#2 | |
| | measObjectId#2 |
| | reportConfigId#2 |
| s-Measure(50) | |
| MeasGap(Setup) | |
| measIdList | |
| | measObjectId#1 |
| | measObjectId#2 |
| reportConfigList | |
| | reportConfigId#1 |
| | reportConfigId#2 |
| s-Measure Ignore Flag (measId#2) | |
| MeasGap Release Flag (measId#2) | |

Fig. 14B

AFTER S59

| measId#1 | |
| --- | --- |
| | measObjectId#1 |
| | reportConfigId#1 |
| s-Measure(50) | |
| MeasGap(Release) | |
| measIdList | |
| | measObjectId#1 |
| | measObjectId#2 |
| reportConfigList | |
| | reportConfigId#1 |
| | reportConfigId#2 |

Fig. 14C

BEFORE S102

| measId#1 | |
|---|---|
| | measObjectId#1 |
| | reportConfigId#1 |
| s-Measure(50) | |
| MeasGap(Release) | |
| measIdList | |
| | measObjectId#1 |
| reportConfigList | |
| | reportConfigId#1 |

Fig. 19A

AFTER S104

| measId#1 | |
|---|---|
| | measObjectId#1 |
| | reportConfigId#1 |
| measId#2 | |
| | measObjectId#2 |
| | reportConfigId#2 |
| s-Measure(Not-setup) | |
| MeasGap(Setup) | |
| measIdList | |
| | measObjectId#1 |
| | measObjectId#2 |
| reportConfigList | |
| | reportConfigId#1 |
| | reportConfigId#2 |

Fig. 19B

AFTER S203

| measId#1 | |
|---|---|
| | measObjectId#1 |
| | reportConfigId#1 |
| s-Measure(50) | |
| MeasGap(Release) | |
| measIdList | |
| | measObjectId#1 |
| | measObjectId#2 |
| reportConfigList | |
| | reportConfigId#1 |
| | reportConfigId#2 |

Fig. 19C

BASE STATION, SERVICE PROVIDING DEVICE, USER EQUIPMENT, MOBILE COMMUNICATION SYSTEM, AND COMMUNICATION CONTROL METHOD THEREFOR

CROSS REFERENCE TO RELATED APPLICATIONS

This application is a National Stage of International Application No. PCT/JP2011/003064 filed May 31, 2011, claiming priority based on Japanese Patent Application No. 2010-188546 filed Aug. 25, 2010, the contents of all of which are incorporated herein by reference in their entirety.

TECHNICAL FIELD

The present invention relates to a base station, a user equipment, a mobile communication system, and a communication control method therefor, and particularly to a technique for acquiring a reception status at the user equipment of a radio signal upon providing LCS (Location Services).

BACKGROUND ART

In recent years, 3GPP (3rd Generation Partnership Project) is under consideration of introducing LTE (Long Term Evolution) as a next generation mobile communication system and the standardization thereof is in progress (see NPTL 1, for example).

As shown in FIG. 15, in LTE, an E-UTRAN (Evolved Universal Terrestrial Radio Access Network) is formed by using a plurality of radio base stations (eNB: enhanced Node B) 10_1 to 10_i. A user equipment (UE) 20 attaches to one of cells formed by the eNBs 10_1 to 10_i to perform desired communication. Moreover, each of the eNBs 10_1 to 10_i is connected to an MME (Mobility Management Entity) 30. The MME 30 has functions corresponding to a core network in the existing mobile communication system and performs various control on the eNBs 10_1 to 10_i. Note that in the following explanation, the eNBs 10_1 to 10_i may be collectively referred to by a numeral 10.

An interface between the eNB and the MME is defined as an S1 interface, an interface between the eNBs is defined as an X2 interface, and a wireless interface between the eNB and the UE is defined as a Uu interface, respectively.

Further, introduction of the LCS is also taken into consideration for the standardization by 3GPP (see NPTL 2 to 4, for example). Typically, in the LCS, a geographical location of the UE is detected, and a service intended for a subscriber corresponding to the location and the like are provided.

Specifically, as shown in FIG. 16, a mobile communication system realizing the LCS includes the above eNB 10, UE 20, MME 30, and an E-SMLC (Evolved Serving Mobile Location Centre) 40 which is a service provider. An interface between the E-SMLC and the MME is defined as an SLs interface.

The function of the E-UTRAN in the LCS is to acquire information regarding a reception status at the UE of a radio signal (RSRP (Reference Signal Received Power) and RSRQ (Reference Signal Received Quality) etc.) in order to calculate the geographical location and direction, and to notify the E-SMLC of the acquired information. This function is referred to as a UE Positioning function.

One of the UE Positioning functions is an Uplink E-CID (Enhanced Cell ID) Positioning Procedure.

Hereinafter, an operation of the mobile communication system regarding this procedure will be described in detail with reference to FIGS. 17, 18, 19A to 19C, and 20.

As shown in FIG. 17, the eNB 10 firstly receives, from the E-SMLC 40 through the MME 30, an E-CID MEASUREMENT INITIATION REQUEST which is a kind of LLPa (LTE Positioning Protocol Annex) messages (step S101). Note that the LLPa message may be referred to as "LLPa: XXX (arbitrary message type)" in the following explanation upon mentioning the LLPa message.

The E-CID MEASUREMENT INITIATION REQUEST message is typically a request to acquire necessary information for calculating the geographical location and direction. In the example shown in FIG. 17, both RSRP and RSRQ are requested as the necessary information (however, either RSRP or RSRQ may be requested as well). Moreover, "On Demand" indicating only one notification of the necessary information or "Periodic" indicating periodic notification of the necessary information is also designated in the E-CID MEASUREMENT INITIATION REQUEST message.

Then, the eNB 10 transmits to the UE 20 RRCConnectionReconfiguration which is a kind of RRC (Radio Resource Control) messages, thereby instructing the UE 20 to report the necessary information (step S102). Note that the RRC message may be referred to as "RRC:YYY (arbitrary message type)" in the following explanation upon mentioning the RRC message.

Measurement Object, Reporting Configuration, Measurement Identity, s-Measure, Measurement Gap (MeasGap) and the like are set to the RRCConnectionReconfiguration message.

Among them, the Measurement Object includes information concerning a frequency which the UE 20 should measure and a neighbouring cell (a cell formed by another radio base station disposed adjacent to the eNB 10).

FIG. 18 shows some arrangement examples of neighbouring cells. Among them, an Intra-Freq neighbouring cell 51 operates in the same frequency as a serving cell (a cell formed by the eNB 10) 50 and a part of coverage of the intra-Freq neighbouring cell 51 overlaps coverage of the serving cell 50. Both Inter-Freq neighbouring cells 52A and 52B (hereinafter may be collectively referred to by a numeral 52) operate in a difference frequency from the serving cell 50. Meanwhile, coverage of the cell 52A includes the coverage of the serving cell 50 (substantially equivalent to the coverage of the serving cell 50 or larger than the coverage of the serving cell 50). On the other hand, a part of coverage of the cell 52B overlaps the coverage of the serving cell 50. Further, both Inter-RAT neighbouring cells 53A and 53B (hereinafter may be collectively referred to by a numeral 53) are formed by radio base stations to which Radio Access Technology (RAT) different from the eNB 10 is applied. Meanwhile, coverage of the cell 53A includes the coverage of the serving cell 50. On the other hand, a part of coverage of the cell 53B overlaps the coverage of the serving cell 50. All of these neighbouring cells 51 to 53 could be designated objects to be measured by the UE 20.

Next, in the Reporting Configuration, an event type for the UE 20 to use in a report of a measurement result and reporting condition thereof are designated. Additionally, the above-mentioned "On Demand" or "Periodic" is also designated in the Reporting Configuration.

Next, the Measurement Identity is composed of measId, measObjectId, and reportConfigId. The measObjectId is defined in one-to-one association with the above Measurement Object. That is, the UE 20 can comprehend the information concerning the frequency to be measured and the information concerning the neighbouring cell from the measObjectId. Moreover, the reportConfigId is defined in one-to-one association with the abovementioned Reporting Configuration. That is, the UE 20 can comprehend the event type to be used in the report of the measurement result and the reporting condition thereof from the reportConfigId. Further, the measId is an identifier for associating the measObjectId with the reportConfigId. In the example shown in FIG. 17, the eNB includes in the RRCConnectionReconfiguration message certain measObjectId#2 and reportConfigId#2, and measId#2 for associating them.

Next, to the s-Measure, a threshold is set as a measurement condition for the neighbouring cell with the matching measId. The UE 20 compares this threshold with RSRP of the serving cell, and performs measurement of the neighbouring cell when the RSRP of the serving cell is less than or equal to the threshold. That is, when the RSRP of the serving cell is less than or equal to the threshold, the UE 20 performs measurement of both the serving cell and the neighbouring cell. On the contrary, when RSRP of the serving cell exceeds the threshold, the UE 20 performs measurement of only the serving cell and not the neighbouring cell. Moreover, as shown in FIG. 17, when the threshold is not set to the s-Measure, the UE 20 immediately measures both the serving cell and the neighbouring cell.

A benefit of not setting the threshold to the s-Measure typically lies in the point that the E-SMLC 40 can calculate the geographical location and direction of the UE 20 with high accuracy.

Specifically, in a case where the threshold is set to the s-Measure and the RSRP of the serving cell exceeds the threshold, the UE 20 reports RSRP and RSRQ of only the serving cell. The RSRP and RSRQ are used by the E-SMLC 40 to estimate the distance between the eNB 10 and the UE 20, and the like. Under an environment providing favorable wireless transmissions between the eNB 10 and the UE 20, the E-SMLC 40 can accurately calculate the geographical location of the UE 20 only from the RSRP and RSRQ of the serving cell.

However, under an environment with poor wireless transmissions (an environment where buildings are built up, for example), even when the RSRP of the serving cell exceeds the threshold, the E-SMLC 40 may not be able to accurately calculate the geographical location of the UE 20 only from the RSRP and RSRQ of the serving cell.

For example, when RSRP and RSRQ of any one of the neighbouring cells 51 to 53 shown in FIG. 18 are acquired, the E-SMLC 40 can calculate the geographical location of the UE 20 more accurately. In particular, each of the Inter-Freq neighbouring cell 52A and the Inter-RAT neighbouring cell 53A has substantially equivalent coverage to that of the serving cell 50, thus RSRP and RSRQ of these neighbouring cells 52A and 53A are useful for calculation in the E-SMLC 40.

Therefore, the eNB 10 is assumed to transmit to the UE 20 the RRCConnectionReconfiguration message without setting the threshold to the e-Measure.

Lastly, in the MeasGap, a measurement timing (subframe, to be specific) is designated in a case of measuring the Inter-Freq neighbouring cell or the Inter-RAT neighbouring cell.

Then, the UE 20 updates its own configuration in accordance with contents of the received RRCConnectionReconfiguration message (step S103). Assume that configuration information as shown in FIG. 19A is stored to a memory in the UE 20 before the above step S102. In FIG. 19A, s-Measure (50) indicates that the above threshold is set to "50 dB". Moreover, MeasGap (Release) indicates that the above measurement timing is not set. In this case, as shown in FIG. 19B, the UE 20 adds measId#2, measObjectId#2 and reportConfigId#2 to the memory, and updates the e-Measure to "Not-setup" and the MeasGap to "Setup".

After that, the UE 20 transmits to the eNB 10 an RRC: RRCConnectionReconfigurationComplete message (step S104).

Moreover, the UE 20 starts measurement of both the serving cell and the neighbouring cell in accordance with the configuration information updated at the above step S103. Then, the UE 20 sets the measurement result to an RRC: MeasurementReport message to be reported to the eNB 10 (step S105_1). Note that when the measurement of the neighbouring cell is not started (in other words, in a case where the threshold is set to the s-Measure and RSRP of the serving cell is less than or equal to the threshold), the UE 20 sets the measurement result of only the serving cell to the MeasurementReport message.

Subsequently, the eNB 10 sets the measurement result reported from the UE 20 to an LPPa:E-CID MEASUREMENT INITIATION RESPONSE message, and notifies it to the E-SMLC 40 through the MME 30 (step S106_1).

In addition, if the abovementioned "Periodic" is designated, the UE 20 repeats measurement in a predetermined cycle, and sets measurement results to MeasurementReport messages to be sequentially reported to the eNB 10 (steps S105_2 to S105_j).

On the other hand, the eNB 10 sets the measurement results from the UE 20 to LPPa:E-CID MEASUREMENT REPORT messages and sequentially notifies them to the E-SMLC 40 through the MME 30 until the eNB 10 receives, at the step S107 described later, an LPPa:E-CID MEASUREMENT TERMINATION COMMAND message from the E-SMLC 40 (steps S106_2 to S106_j).

Then, the eNB 10 stops notifying the E-SMLC 40 of the E-CID MEASUREMENT REPORT message triggered by the reception of the E-CID MEASUREMENT TERMINATION COMMAND message (step S107).

After that, as shown in FIG. 20, the eNB 10 transmits again to the UE 20 an RRCConnectionReconfiguration message in order to return the configuration of the UE 20 to the state before update (step S201). Specifically, the eNB 10 sets the measId#2, s-Measure (50) and MeasGap (Release) in the RRCConnectionReconfiguration message.

Subsequently, the UE 20 updates its own configuration in accordance with contents of the received RRCConnectionReconfiguration message (step S202). Note that in the following explanation, returning the configuration information of the UE 20 to the state before update may be referred to as "configuration removal". Specifically, as shown in FIG. 19C, the UE 20 removes the measId#2 (together with the measObjectId#2 and the reportConfigId#2 that are stored in association with the measId#2) from the memory, and updates the e-Measure to "50 dB" and the MeasGap to "Release".

Note that if "On Demand" is designated at the above step S101, the eNB 10 does not need to set the measId#2 in the RRCConnectionReconfiguration message at the above step S201. When "On Demand" is designated, the UE 20 autonomously removes the measId#2 from the memory after transmitting the MeasurementReport message at the above step S105_1.

After that, the UE 20 transmits to the eNB 10 an RRC: RRCConnectionReconfigurationComplete message again (step S203). Thus, the UE 20 operates in a similar manner as before starting the Uplink E-CID Positioning Procedure.

CITATION LIST

Non Patent Literature

NPTL 1: 3GPP TS 36.300, "Evolved Universal Terrestrial Radio Access (E-UTRA) and Evolved Universal Terrestrial Radio Access Network (E-UTRAN); Overall description", V9.2.0, December 2009, Clause 4, pp. 17 to 27

NPTL 2: 3GPP TS 36.331, "Evolved Universal Terrestrial Radio Access (E-UTRA) Radio Resource Control (RRC); Protocol specification", V9.1.0, December 2009, Clauses. 3.5.1 to 5.3.5.3, 5.5.2, 5.5.3, 5.5.5, 5.5.6, 6.2.2, and 6.3.5, pp. 40 to 42, 64 to 70, 76 to 79, 91 to 117, and 165 to 180

NPTL 3: 3GPP TS 36.305, "Evolved Universal Terrestrial Radio Access Network (E-UTRAN); Stage 2 functional specification of User Equipment (UE) positioning in E-UTRAN", V9.1.0, December 2009, Clause 5, pp. 11 to 15

NPTL 4: 3GPP TS 36.455, "Evolved Universal Terrestrial Radio Access (E-UTRA); LTE Positioning Protocol A (LPPa)", V9.1.0, March 2010, Clauses 8.2.1, 8.2.3, 8.2.4, 9.1.1.1, 9.1.1.2, 9.1.1.5, and 9.1.1.6, pp. 10 to 12 and 14 to 16

Patent Literature

PTL 1: Published Japanese Translation of PCT International Publication for Patent Application, No. 2010-512098

SUMMARY OF INVENTION

Technical Problem

However, there has been a problem in the above NPTLs 2 to 4 that utilization efficiency of communication resources is low.

Specifically, when the UE periodically reports the measurement result (MeasurementReport message) to the eNB, it is necessary for the eNB to receive the E-CID MEASUREMENT TERMINATION COMMAND message from the E-SMLC in order to stop transmission of the MeasurementReport message, thereby wasting wired resources.

Moreover, in order to perform the configuration removal of the measID, the s-Measure and the MeasGap, it is necessary for the eNB to retransmit the RRCConnectionReconfiguration message to the UE, thereby wasting radio resources.

Explained below are the reasons why the configuration removal of the measID, the configuration removal of the s-Measure, and the configuration removal of the MeasGap are necessary.

[Reason why Configuration Removal of measID is Necessary]

In a case where the configuration of the measID is not removed upon the periodical report of the measurement result from the UE to the eNB, the UE continues to measure the cell with the matching measId in vain. For this reason, problems arise in the UE such as an increase in the power consumption. Therefore, the configuration removal of the measID is necessary.

[Reason why Configuration Removal of s-Measure is Necessary]

Setting of the s-Measure is applied in common to all measIDs. For this reason, when the s-Measure remains to be "Not-setup", the UE performs measurement of the neighbouring cell with the matching measID, which is set before starting the Uplink E-CID Positioning Procedure, regardless of the communication quality of the serving cell. For example, assume that the eNB causes the UE to perform measurement regarding a certain measID in an attempt to identify a handover target cell. In this case, even when the communication quality of the serving cell is maintained, the UE performs measurement of the neighbouring cell in vain, thereby generating a problem such as an increase in the power consumption. Therefore, the configuration removal of the s-Measure is necessary.

[Reason why Configuration Removal of MeasGap is Necessary]

In a case where the configuration of the MeasGap is not removed, the UE continues to operate in accordance with this configuration. There is a limitation in the subframe designated in the MeasGap that scheduling of UL (Uplink) transmission and DL (Downlink) transmission should not be performed. For this reason, when there are a number of UEs in which the MeasGap is set, the limitation regarding the UL transmission and DL transmission scheduling increases, thereby possibly leading to significant deterioration in transmission efficiency. Therefore, the configuration removal of the MeasGap is necessary.

Note that as reference technology, PTL 1 discloses a technique in which a UE performs measurement of a serving cell and a neighbouring cell at intermittent intervals that should receive schedule information, and in the case where "reception signal strength of the neighbouring cell≥reception signal strength of the serving cell" is satisfied for a predetermined time, the UE transmits a measurement result to an eNB. However, this technique cannot address the above problems at all but originally aims to suppress reports of the measurement results from the UE, thus this technique is not suitable for the LCS.

Accordingly, one exemplary object of the present invention is to improve utilization efficiency of communication resources in a case of acquiring a reception status at a user equipment of a radio signal upon providing LCS.

Solution to Problem

In order to achieve the above exemplary object, a base station according to a first exemplary aspect of the invention includes first communication means for wirelessly communicating with a user equipment, second communication means for communicating with a service providing device that provides a service corresponding to a location of the user equipment, and control means for controlling the first and second communication means. The control means is configured to instruct, in response to one request from the service providing device, the user equipment to perform first measurement on a reception status of a radio signal from the own base station, and indicate to the user equipment a number of reports for the user equipment to report a result of the first measurement. The number of reports is requested by the service providing device. The control means is further configured to sequentially notify the service providing device of the result of the first measurement reported from the user equipment for the number of reports, and autonomously complete a response to the request when the notification is performed for the number of reports.

Further, a base station according to a second exemplary aspect of the invention includes first communication means for wirelessly communicating with a user equipment, second communication means for communicating with a service providing device that provides a service corresponding to a location of the user equipment, and control means for controlling the first and second communication means. The control means is configured to instruct, in response to a request from the service providing device, the user equipment to perform measurement on a reception status of a radio signal from a different base station disposed adjacent to the own base station regardless of a predetermined condition for measurement, and notify the service providing device of a result of the measurement reported from the user equipment.

Further, a base station according to a third exemplary aspect of the invention includes first communication means for wirelessly communicating with a user equipment, second communication means for communicating with a service providing device that provides a service corresponding to a location of the user equipment, and control means for controlling the first and second communication means. The control means is configured to instruct, in response to a request from the service providing device, the user equipment to perform measurement on a reception status of a radio signal from a different base station that is disposed adjacent to the own base station, and that uses a radio frequency different from the own base station or to which radio access technology different from the own base station is applied, and indicate to the user equipment a timing for the user equipment to perform the measurement. The control means is further configured to instruct the user equipment to disable configuration regarding the timing upon completion of the measurement, and notify the service providing device of a result of the measurement reported from the user equipment.

Further, a service providing device according to a fourth exemplary aspect of the invention includes communication means for communicating with a base station, and control means for controlling the communication means to provide a service corresponding to a location of a user equipment attaching to the base station. The control means is configured to request the base station to notify a result of measurement on a reception status at the user equipment of a radio signal at least from the base station for a predetermined number of times, evaluate that a response to the request is completed by the base station when the notification is performed for the number of times, and calculate the location using the result of the measurement.

Further, a user equipment according to a fifth exemplary aspect of the invention includes communication means for wirelessly communicating with a base station, and control means for controlling the communication means. The control means is configured to perform, in response to an instruction from the base station, measurement on a reception status of a radio signal at least from the base station for a number of times indicated by the base station, and sequentially report a result of the measurement to the base station for the number of times.

Further, a user equipment according to a sixth exemplary aspect of the invention includes communication means for wirelessly communicating with a base station, and control means for controlling the communication means. The control means is configured to perform, in response to one instruction from the base station, measurement on a reception status of a radio signal from a different base station disposed adjacent to the base station regardless of a predetermined condition for measurement, and report a result of the measurement to the base station.

Further, a user equipment according to a seventh exemplary aspect of the invention includes communication means for wirelessly communicating with a base station, and control means for controlling the communication means. The control means is configured to perform, in response to one instruction from the base station, measurement on a reception status of a radio signal from a different base station that is disposed adjacent to the base station, and that uses a radio frequency different from the base station or to which radio access technology different from the base station is applied at a timing indicated by the base station, disable configuration regarding the timing upon completion of the measurement, and notify the base station of a result of the measurement.

Further, a mobile communication system according to an eighth exemplary aspect of the invention includes a base station, a user equipment that wirelessly communicates with the base station, and a service providing device that communicates with the base station to provide a service corresponding to a location of the user equipment. The service providing device requests the base station to notify a result of measurement on a reception status at the user equipment of a radio signal at least from the base station for a predetermined number of times, and calculates the location using the result of the measurement when the notification is performed for the number of times. In response to the request, the base station instructs the user equipment to perform the measurement for the number of times, and sequentially notifies the service providing device of the result of the measurement reported from the user equipment for the number of times. In response to the instruction, the user equipment performs the measurement on the reception status for the number of times, and sequentially notifies the base station of the result of the measurement for the number of times.

Further, a mobile communication system according to a ninth exemplary aspect of the invention includes a base station, a user equipment that wirelessly communicates with the base station, and a service providing device that communicates with the base station to provide a service corresponding to a location of the user equipment. In response to a request from the service providing device, the base station instructs the user equipment to perform measurement on a reception status of a radio signal from a different base station disposed adjacent to the base station regardless of a predetermined condition for measurement, and notifies the service providing device of a result of the measurement reported from the user equipment. In response to the instruction, the user equipment performs the measurement on the reception status regardless of the condition for measurement, and reports the result of the measurement to the base station. The service providing device calculates the location using the result of the measurement.

Further, a mobile communication system according to a tenth exemplary aspect of the invention includes a base station, a user equipment that wirelessly communicates with the base station, and a service providing device that communicates with the base station to provide a service corresponding to a location of the user equipment. In response to a request from the service providing device, the base station instructs the user equipment to perform measurement on a reception status of a radio signal from a different base station that is disposed adjacent to the base station, and that uses a radio frequency different from the base station or to which radio access technology different from the base station is applied, indicates to the user equipment a timing for the user equipment to perform the measurement, instructs the user equipment to disable configuration regarding the timing upon completion of the measurement, and notifies the service providing device of a result of the measurement reported from the user equipment. In response to the instruction, the user equipment performs the measurement on the reception status at the timing, disables the configuration regarding the timing upon the completion of the measurement, and reports the result of the measurement to the base station. The service providing device calculates the location using the result of the measurement.

Further, a communication control method according to an eleventh exemplary aspect of the invention provides a method of controlling communication in a base station that wirelessly communicates with a user equipment and that communicates with a service providing device for providing a service corresponding to a location of the user equipment. This communication control method includes, in response to one request from the service providing device, instructing the user equipment to perform measurement on a reception status of a radio signal from the own base station, and indicating to the user equipment a number of reports for the user equipment to report a result of the measurement. The number of reports is requested by the service providing device. This communication control method further includes sequentially notifying the service providing device of the result of the measurement reported from the user equipment for the number of reports, and autonomously completing a response to the one request when the notification is performed for the number of reports.

Further, a communication control method according to a twelfth exemplary aspect of the invention provides a method of controlling communication in a base station that wirelessly communicates with a user equipment and that communicates with a service providing device for providing a service corresponding to a location of the user equipment. This communication control method includes, in response to a request from the service providing device, instructing the user equipment to perform measurement on a reception status of a radio signal from a different base station disposed adjacent to the base station regardless of a predetermined condition for measurement, and notifying the service providing device of a result of the measurement reported from the user equipment.

Further, a communication control method according to a thirteenth exemplary aspect of the invention provides a method of controlling communication in a base station that wirelessly communicates with a user equipment and that communicates with a service providing device for providing a service corresponding to a location of the user equipment. This communication control method includes, in response to a request from the service providing device, instructing the user equipment to perform measurement on a reception status of a radio signal from a different base station that is disposed adjacent to the base station, and that uses a radio frequency different from the base station or to which radio access technology different from the own base station is applied, indicating to the user equipment a timing for the user equipment to perform the measurement, instructing the user equipment to disable configuration regarding the timing upon completion of the measurement, and notifying the service providing device of a result of the measurement reported from the user equipment.

Further, a communication control method according to a fourteenth exemplary aspect of the invention provides a method of controlling communication in a service providing device that communicates with a base station to provide a service corresponding to a location of a user equipment attaching to the base station. This communication control method includes requesting the base station to notify a result of measurement on a reception status at the user equipment of a radio signal at least from the base station for a predetermined number of times, evaluating that a response to the request is completed by the base station when the notification is performed for the number of times, and calculating the location using the result of the measurement.

Further, a communication control method according to a fifteenth exemplary aspect of the invention provides a method of controlling communication in a user equipment that wirelessly communicates with a base station. This communication control method includes performing, in response to an instruction from the base station, measurement on a reception status of a radio signal at least from the base station for a number of times indicated by the base station, and sequentially notifying the base station of a result of the measurement for the number of times.

Further, a communication control method according to a sixteenth exemplary aspect of the invention provide a method of controlling communication in a user equipment that wirelessly communicates with a base station. This communication control method includes performing, in response to one instruction from the base station, measurement on a reception status of a radio signal from a different base station disposed adjacent to the base station regardless of a predetermined condition for measurement, and reporting a result of the measurement to the base station.

Furthermore, a communication control method according to a seventeenth exemplary aspect of the invention provides a method of controlling communication in a user equipment that wirelessly communicates with a base station. This communication control method includes performing, in response to one instruction from the base station, measurement on a reception status of a radio signal from a different base station that is disposed adjacent to the base station, and that uses a radio frequency different from the base station or to which radio access technology different from the base station is applied at a timing indicated by the base station, disabling configuration regarding the timing upon completion of the measurement, and reporting a result of the measurement to the base station.

Advantageous Effects of Invention

According to the present invention, it is possible to improve utilization efficiency of communication resources in a case of acquiring a reception status at a user equipment of a radio signal upon providing LCS.

BRIEF DESCRIPTION OF DRAWINGS

FIG. 6A shows an example of storing configuration information in the user equipment according to the first exemplary embodiment of the present invention;

FIG. 6B shows a first example of updating the configuration information in the user equipment according to the first exemplary embodiment of the present invention;

FIG. 6C shows a second example of updating the configuration information in the user equipment according to the first exemplary embodiment of the present invention;

FIG. 8A shows an example of storing configuration information in the user equipment according to the second exemplary embodiment of the present invention;

FIG. 8B shows a first example of updating the configuration information in the user equipment according to the second exemplary embodiment of the present invention;

FIG. 10A shows an example of storing configuration information in the user equipment according to the third exemplary embodiment of the present invention;

FIG. 10B shows a first example of updating the configuration information in the user equipment according to the third exemplary embodiment of the present invention;

FIG. 10C shows a second example of updating the configuration information in the user equipment according to the third exemplary embodiment of the present invention;

FIG. 12A shows an example of storing configuration information in the user equipment according to the modification of the third exemplary embodiment of the present invention;

FIG. 12B shows a first example of updating the configuration information in the user equipment according to the modification of the third exemplary embodiment of the present invention;

FIG. 12C shows a second example of updating the configuration information in the user equipment according to the modification of the third exemplary embodiment of the present invention;

FIG. 12D shows a third example of updating the configuration information in the user equipment according to the modification of the third exemplary embodiment of the present invention;

FIG. 14A shows an example of storing configuration information in the user equipment according to the fourth exemplary embodiment of the present invention;

FIG. 14B shows a first example of updating the configuration information in the user equipment according to the fourth exemplary embodiment of the present invention;

FIG. 14C shows a second example of updating the configuration information in the user equipment according to the fourth exemplary embodiment of the present invention;

FIG. 19A shows an example of storing configuration information in a user equipment used in the typical mobile communication system that realizes the LCS;

FIG. 19B shows a first example of updating the configuration information in the user equipment used in the typical mobile communication system that realizes the LCS;

FIG. 19C shows a second example of updating the configuration information in the user equipment used in the typical mobile communication system that realizes the LCS.

DESCRIPTION OF EMBODIMENTS

Figure 1:
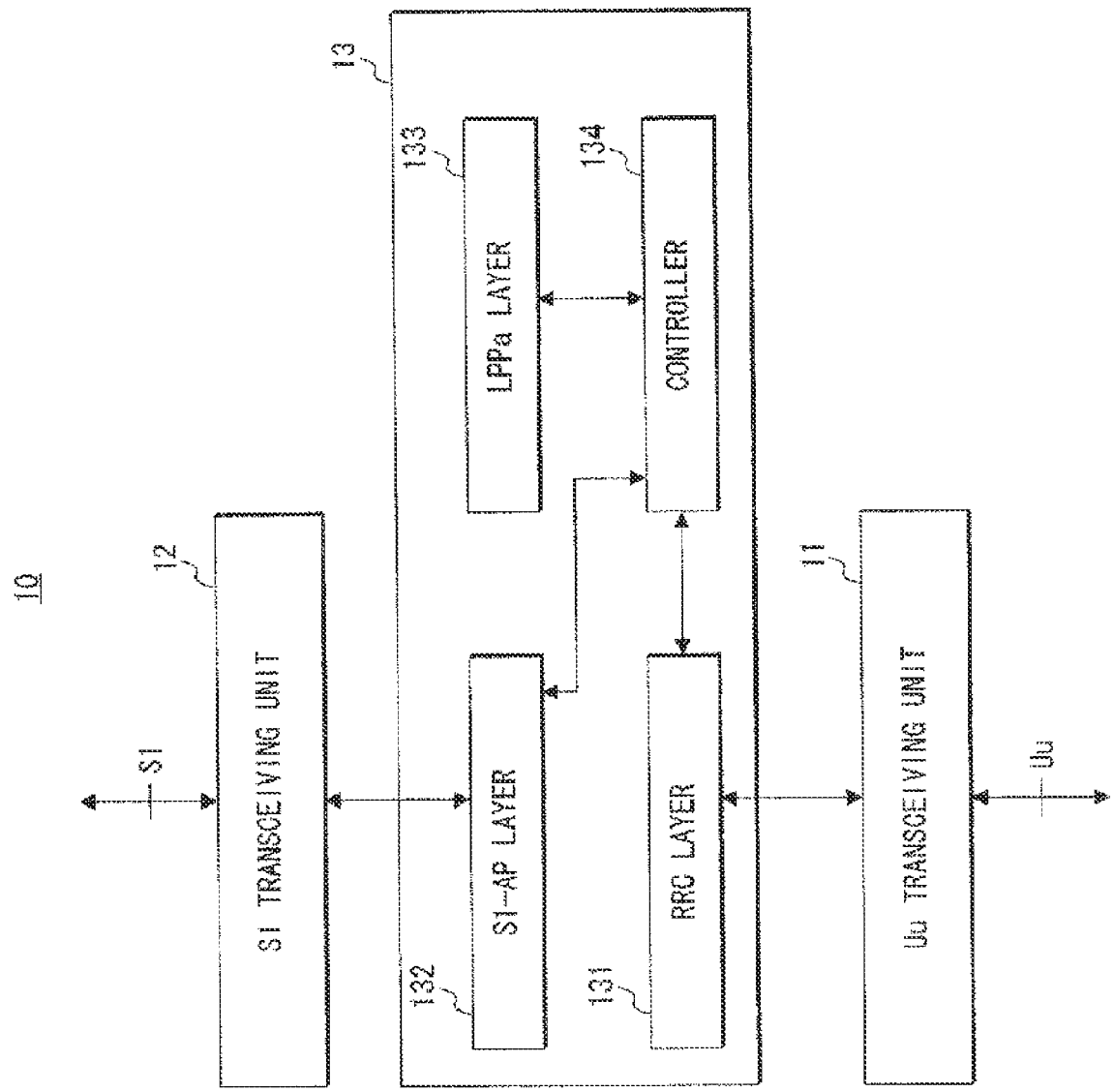
FIG. 1 is a block diagram showing a configuration example of a base station in common to first to fourth exemplary embodiments of the present invention.

Hereinafter, first to fourth exemplary embodiments of a base station, a service providing device, a user equipment, and a mobile communication system to which these base station, service providing device and user equipment are applied will be described with reference to FIGS. 1 to 5, 6A to 6C, 7, 8A to 8C, 9, 10A to 10C, 11, 12A to 12D, 13, and 14A to 14C. Note that in the drawings, the same components are denoted by the same reference numerals and duplicated explanation is omitted as necessary for clarity of explanation.

Moreover, each exemplary embodiment treats as an example a mobile communication system complying with the LTE. However, techniques explained in each exemplary embodiment can be applied not only to the LTE but also to mobile communication systems complying with other communication standards that realize services equivalent to the LCS.

First Exemplary Embodiment

Figure 15:
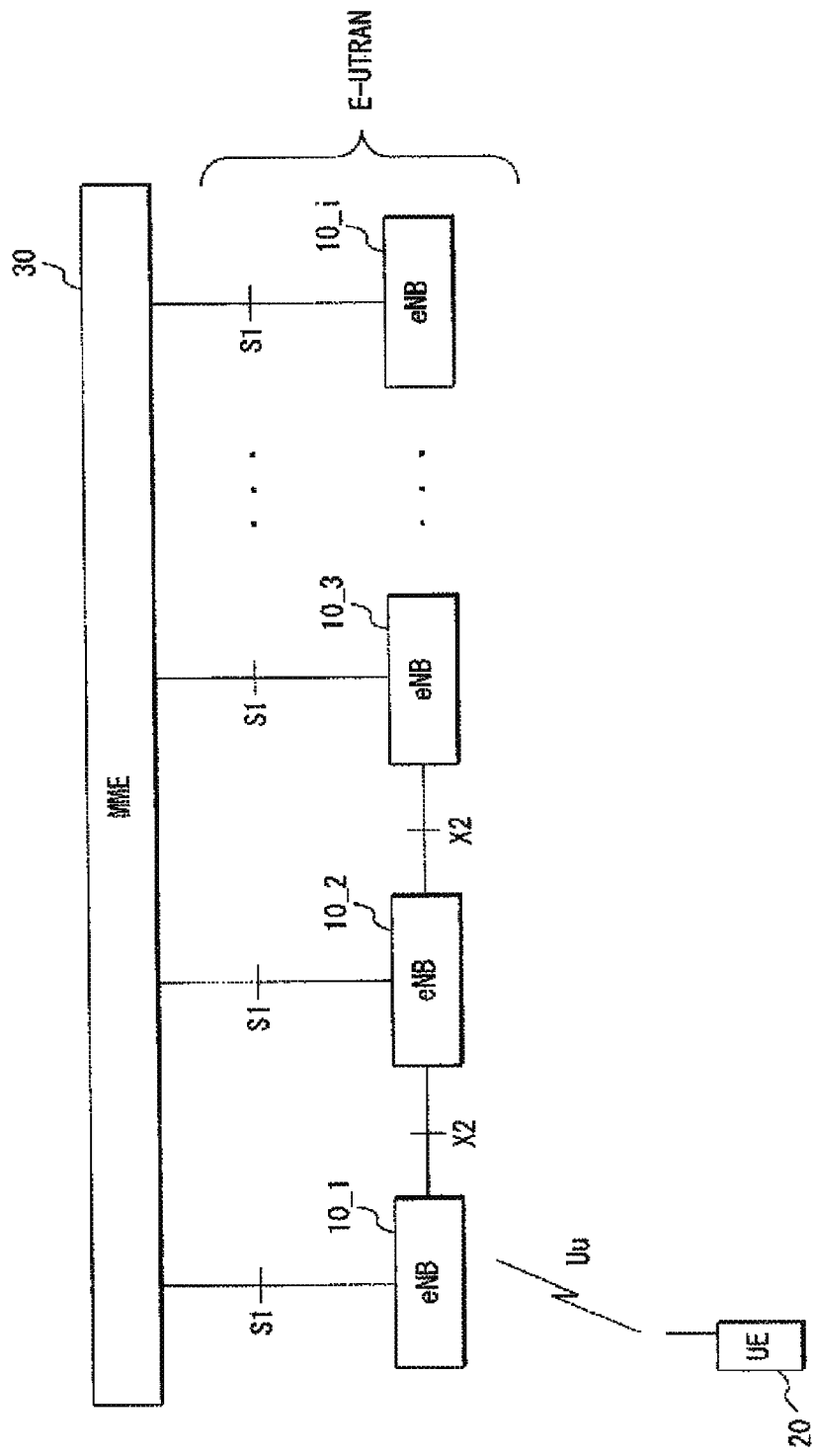
FIG. 15 is a block diagram showing a configuration example of a typical RAN.
Figure 16:
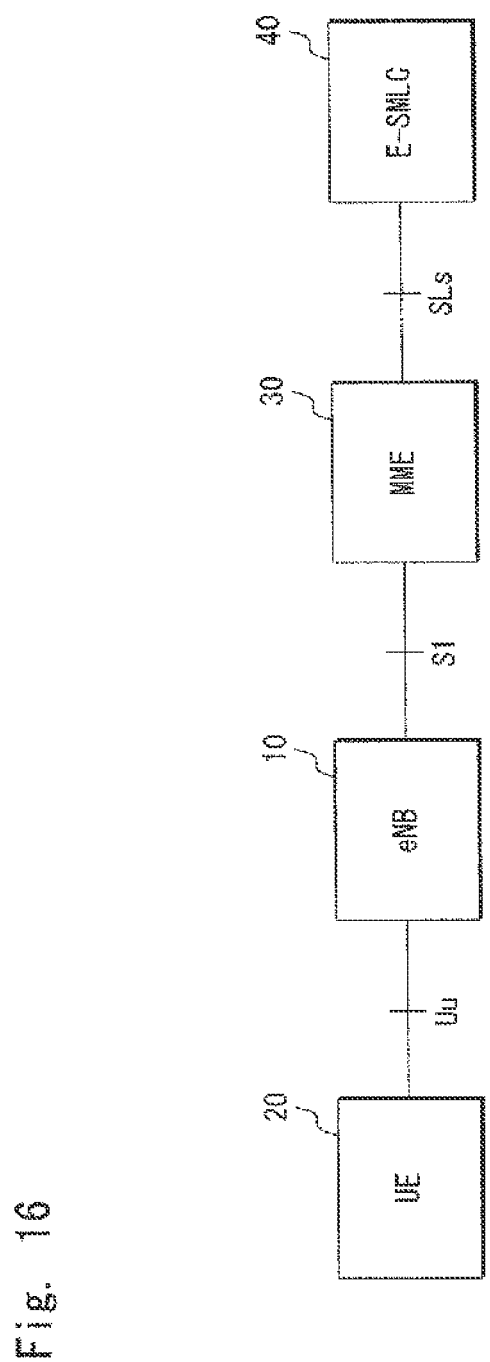
FIG. 16 is a block diagram showing a configuration example of a typical mobile communication system that realizes LCS.

A mobile communication system according to this exemplary embodiment is configured in a similar manner as in FIGS. 15 and 16.

On the other hand, as shown in FIG. 1, an eNB 10 according to this embodiment includes a Uu transceiving unit 11, an S1 transceiving unit 12, and a control unit 13 that controls these transceiving units 11 and 12. The Uu transceiving unit 11 has a function to wirelessly communicate with an UE through the abovementioned Uu interface. The S1 transceiving unit 12 has a function to communicate with an E-SMLC through the abovementioned S1 interface and an MME.

The control unit 13 includes an RRC layer 131, an S1-AP (S1 Application Protocol) layer 132, an LPPa layer 133, and a controller 134. Among them, the RRC layer 131 decodes and generates RRC messages. Further, the S1-AP layer 132 decodes and generates S1-AP messages. Furthermore, the LPPa layer 133 decodes and generates LPPa messages. Moreover, the controller 134 performs processes according to the decoded result by the respective layers 131 to 133, and instructs the respective layers 131 to 133 to generate the messages as necessary.

Figure 2:
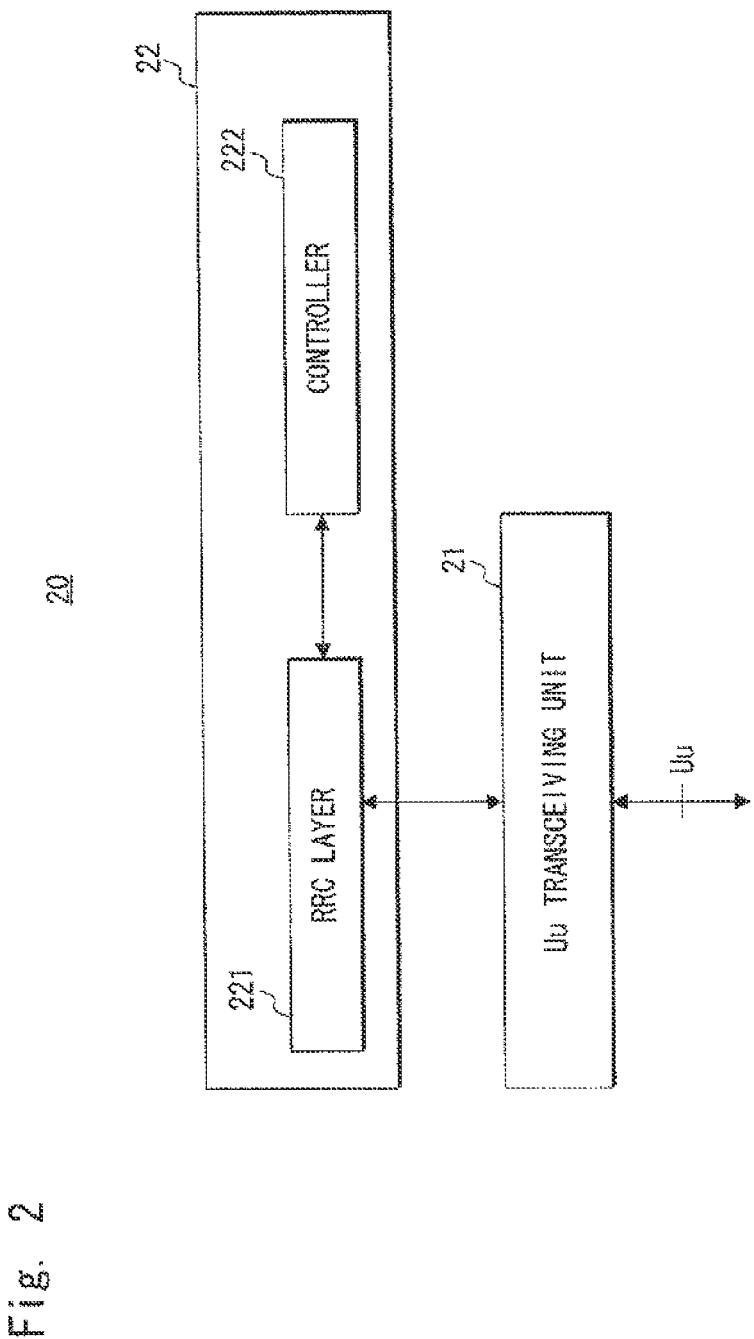
FIG. 2 is a block diagram showing a configuration example of a user equipment in common to the first to fourth exemplary embodiments of the present invention.

Further, as shown in FIG. 2, a UE 20 according to this exemplary embodiment includes a Uu transceiving unit 21 and a control unit 22 that controls this transceiving unit 21. The Uu transceiving unit 21 has a function to wirelessly communicate with the eNB 10 through the Uu interface.

The control unit 22 includes an RRC layer 221 and a controller 222. Among them, the RRC layer 221 has the same function as the abovementioned RRC layer 131. Moreover, the controller 222 performs processes according to the decoded result of the RRC message by the layer 221, and instructs the layer 221 to generate the RRC message as necessary.

Figure 3:
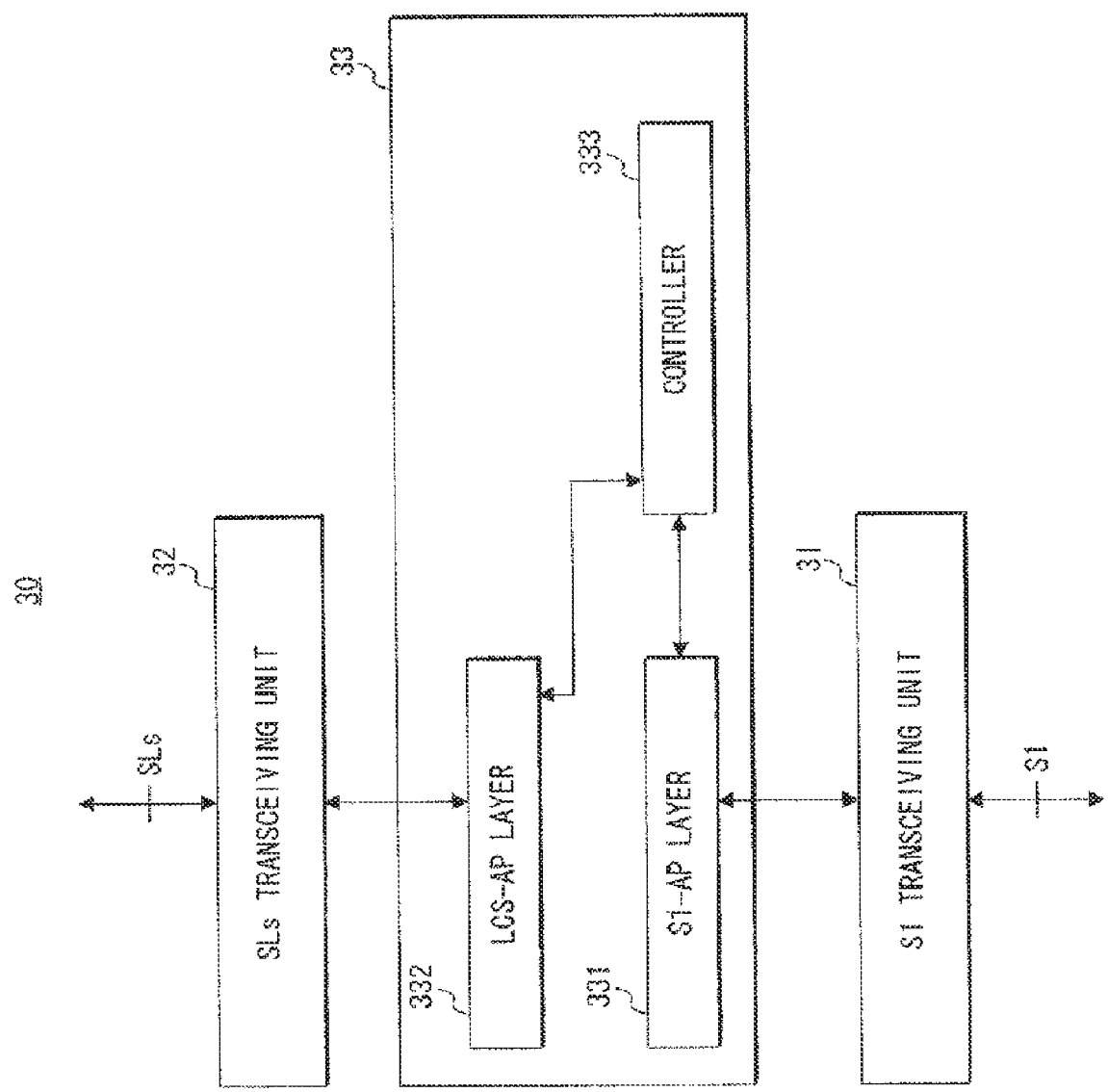
FIG. 3 is a block diagram showing a configuration example of an MME commonly used in the first to fourth exemplary embodiments of the present invention.

Further, as shown in FIG. 3, an MME 30 used in this exemplary embodiment includes an S1 transceiving unit 31, an SLs transceiving unit 32, and a control unit 33. The S1 transceiving unit 32 has a function to communicate with the eNB 10 through the S1 interface. The SLs transceiving unit 32 has a function to communicate with the E-SMLC through the abovementioned SLs interface. The control unit 33 typically has a function to control the transceiving units 31 and 32 to relay traffic between the eNB 10 and the E-SMLC. Specifically, the control unit 33 includes an S1-AP layer 331, an LCS-AP (LCS Application Protocol) layer 332, and a controller 333. Among them, the S1-AP layer 331 has the same function as the abovementioned S1-AP layer 132. Moreover, the LCS-AP layer 332 decodes and generates LCS-AP messages. Further, the controller 333 performs processes according to the decoded result of the message by the respective layers 331 and 332, and instructs the respective layers 331 and 332 to generate the message as necessary.

Figure 4:
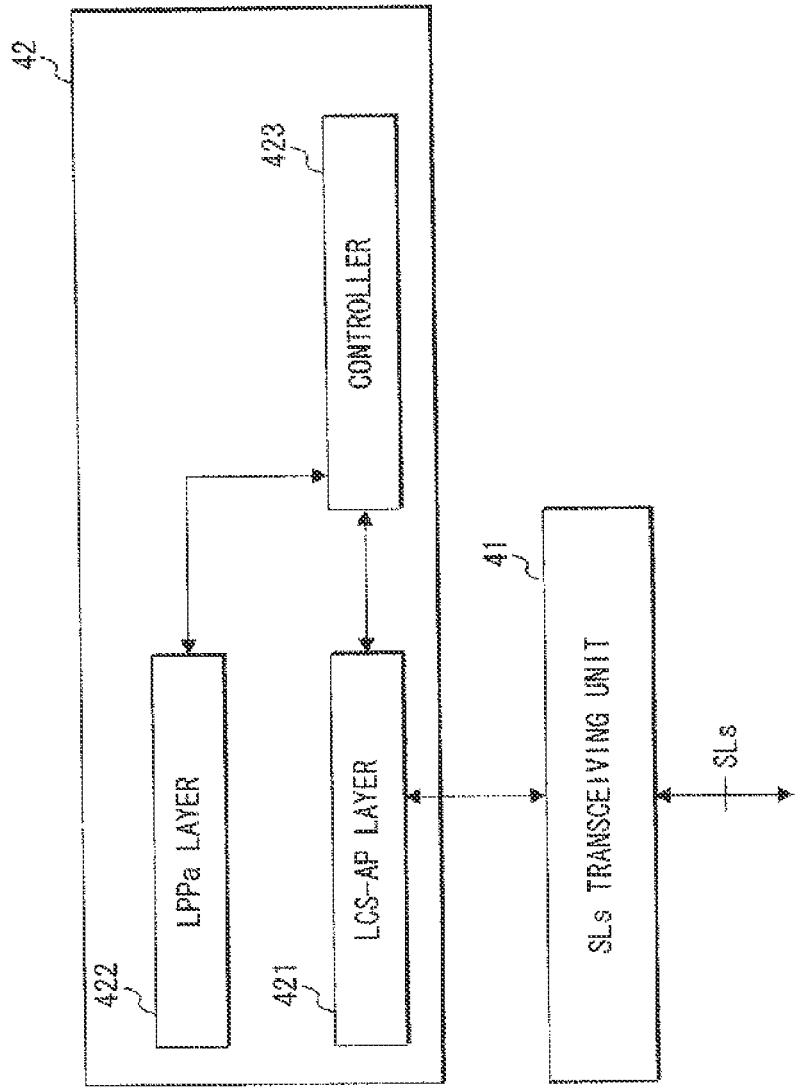
FIG. 4 is a block diagram showing a configuration example of a service providing device in common to the first to fourth exemplary embodiments of the present invention.

Furthermore, as shown in FIG. 4, an E-SMLC 40 according to this exemplary embodiment includes an SLs transceiving unit 41 and a control unit 42 that controls this transceiving unit 41. The SLs transceiving unit 41 has a function to communicate with the eNB 10 through the SLs interface and the MME 30.

The control unit 42 includes an LCS-AP layer 421, an LLPa layer 422, and a controller 423. Among them, the LCS-AP layer 421 has the same function as the abovementioned LCS-AP layer 332. Moreover, the LLPa layer 422 has the same function as the abovementioned LPPa layer 133. Further, the controller 423 performs processes according to the decoded result of the message by the respective layers 421 and 422, and instructs the respective layers 421 and 422 to generate the message as necessary.

Hereinafter, an operation of this exemplary embodiment will be described in detail with reference to FIGS. 5, and 6A to 6C.

Figure 5:
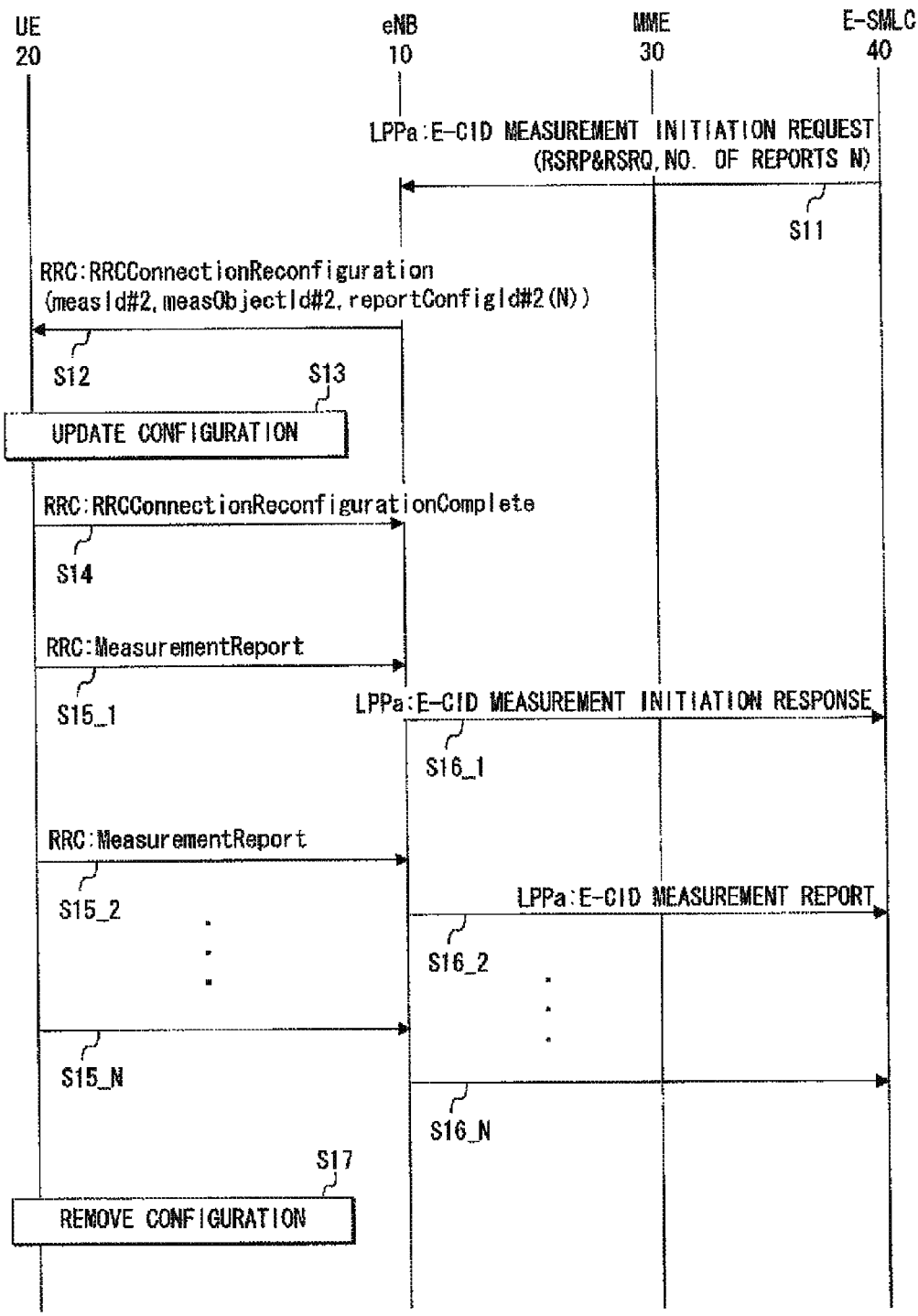
FIG. 5 is a sequence diagram showing an operation example of a mobile communication system according to the first exemplary embodiment of the present invention.

As shown in FIG. 5, the E-SMLC 40 firstly transmits an LLPa:E-CID MEASUREMENT INITIATION REQUEST to the eNB 10 through the MME 30 (step S11).

Both RSRP and RSRQ are requested in the E-CID MEASUREMENT INITIATION REQUEST message as necessary information for calculating a geographical location and direction of the UE 20 (however, either RSRP or RSRQ may be requested as well). Moreover, the number of reports N (N≥1) for the UE 20 to be supposed to report the necessary information is designated in the E-CID MEASUREMENT INITIATION REQUEST message as a substitute for the abovementioned "On Demand" or "Periodic".

Then, the eNB 10 transmits an RRC:RRCConnectionReconfiguration to the UE 20, thereby instructing the UE 20 to report the necessary information (step S12).

Certain measObjectId#2 and reportConfigId#2, and measId#2 that associates them are included in the RRCConnectionReconfiguration message.

The number of reports N is indicated to the UE 20 by the reportConfigId#2, as shown in FIG. 5.

Figure 18:
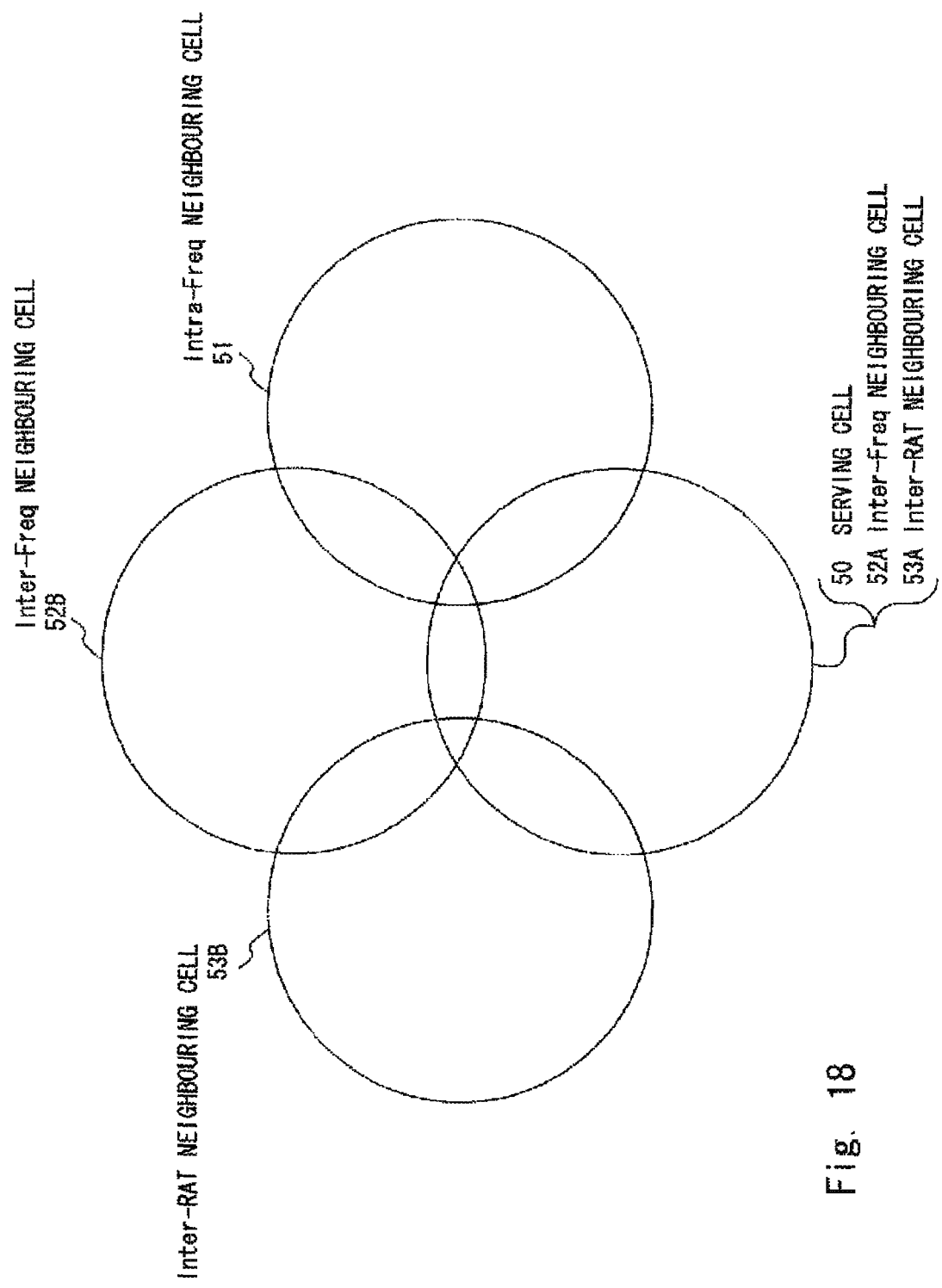
FIG. 18 shows arrangement examples of neighbouring cells.
Figure 20:
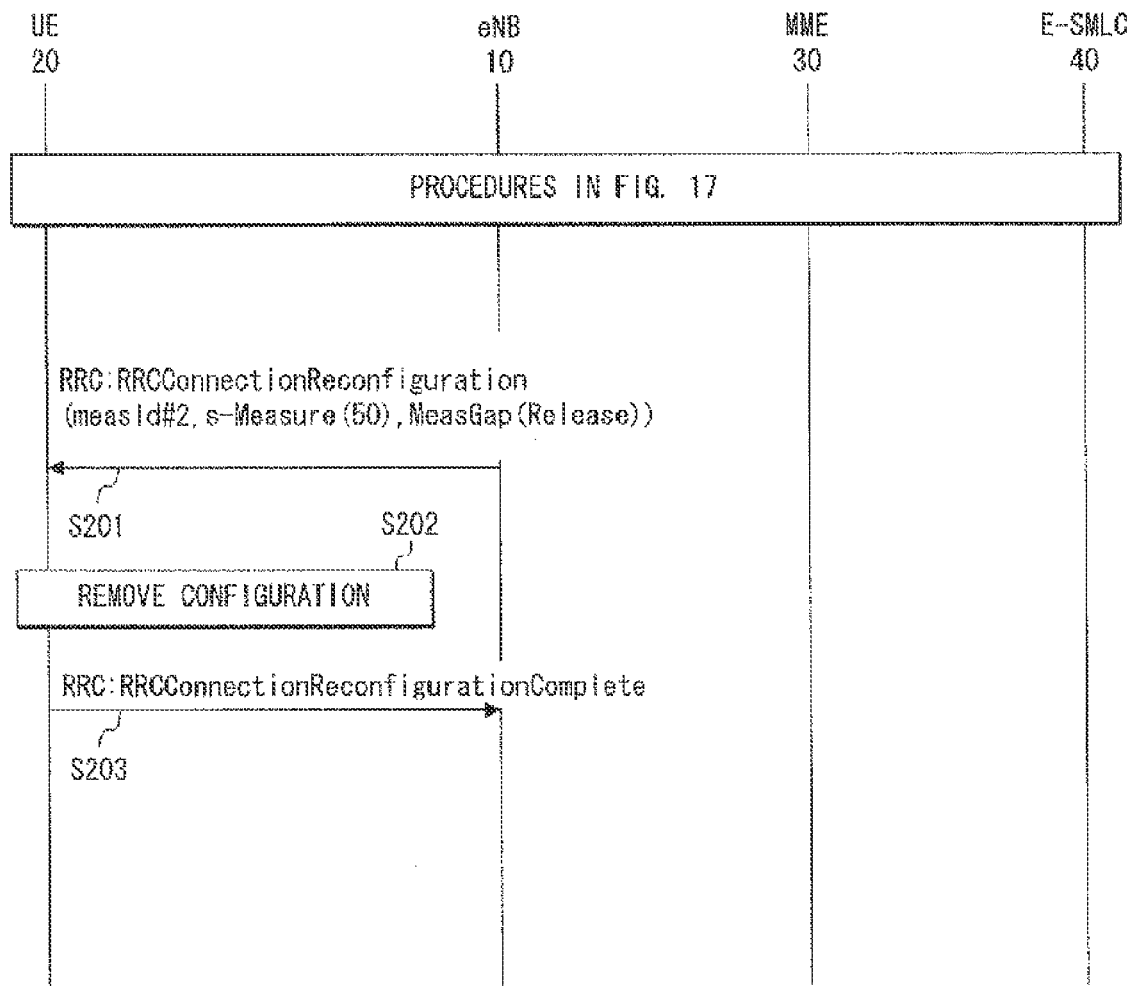
FIG. 20 is a sequence diagram showing an operation example of configuration removal in the typical mobile communication system that realizes the LCS.

Note that in this exemplary embodiment, a measurement result of at least the serving cell 50 (see FIG. 18) may be acquired. Preferably, a measurement result of at least one of the neighbouring cells 51, 52A, 52B, 53A, and 53B may be acquired. In any case, the measurement result is acquired for the number of reports N.

Then, the UE 20 updates its own configuration in accordance with contents of the received RRCConnectionReconfiguration message (step S13). Assume that configuration information is stored to a memory in the UE 20 before the above step S12. In this case, as shown in FIG. 6B, the UE 20 adds measId#2, measObjectId#2, and reportConfigId#2 to the memory.

After that, the UE 20 transmits to the eNB 10 an RRC: RRCConnectionReconfigurationComplete message (step S14).

Moreover, the UE 20 starts measurement of one or more cells in accordance with the configuration information updated at the abovementioned step S13. Next, the UE 20 sets a measurement result to the RRC:MeasurementReport message to be reported to the eNB 10 (step S15_1).

Subsequently, the eNB 10 sets the measurement result reported from the UE 20 to an LPPa:E-CID MEASUREMENT INITIATION RESPONSE message to be notified to the E-SMLC 40 through the MME 30 (step S16_1).

Moreover, the UE 20 repeats the measurement till the number of reports N, and sets measurement results to MeasurementReport messages to be sequentially reported to the eNB 10 (steps S15_2 to S15_N).

On the other hand, the eNB 10 sets the measurement results from the UE 20 to LPPa:E-CID MEASUREMENT REPORT messages to be sequentially notified to the E-SMLC 40 through the MME 30 (steps S16_2 to S16_N).

After the measurement for the number of reports N is completed, the UE 20 autonomously performs configuration removal (step S17). Specifically, as shown in FIG. 6C, the UE 20 removes from the memory the measId#2 (together with the measObjectId#2 and the reportConfigId#2 that are stored in association with the measId#2).

On the other hand, after the notification for the number of reports N is completed, the eNB 10 autonomously completes a response to the E-CID MEASUREMENT INITIATION REQUEST message.

Figure 17:
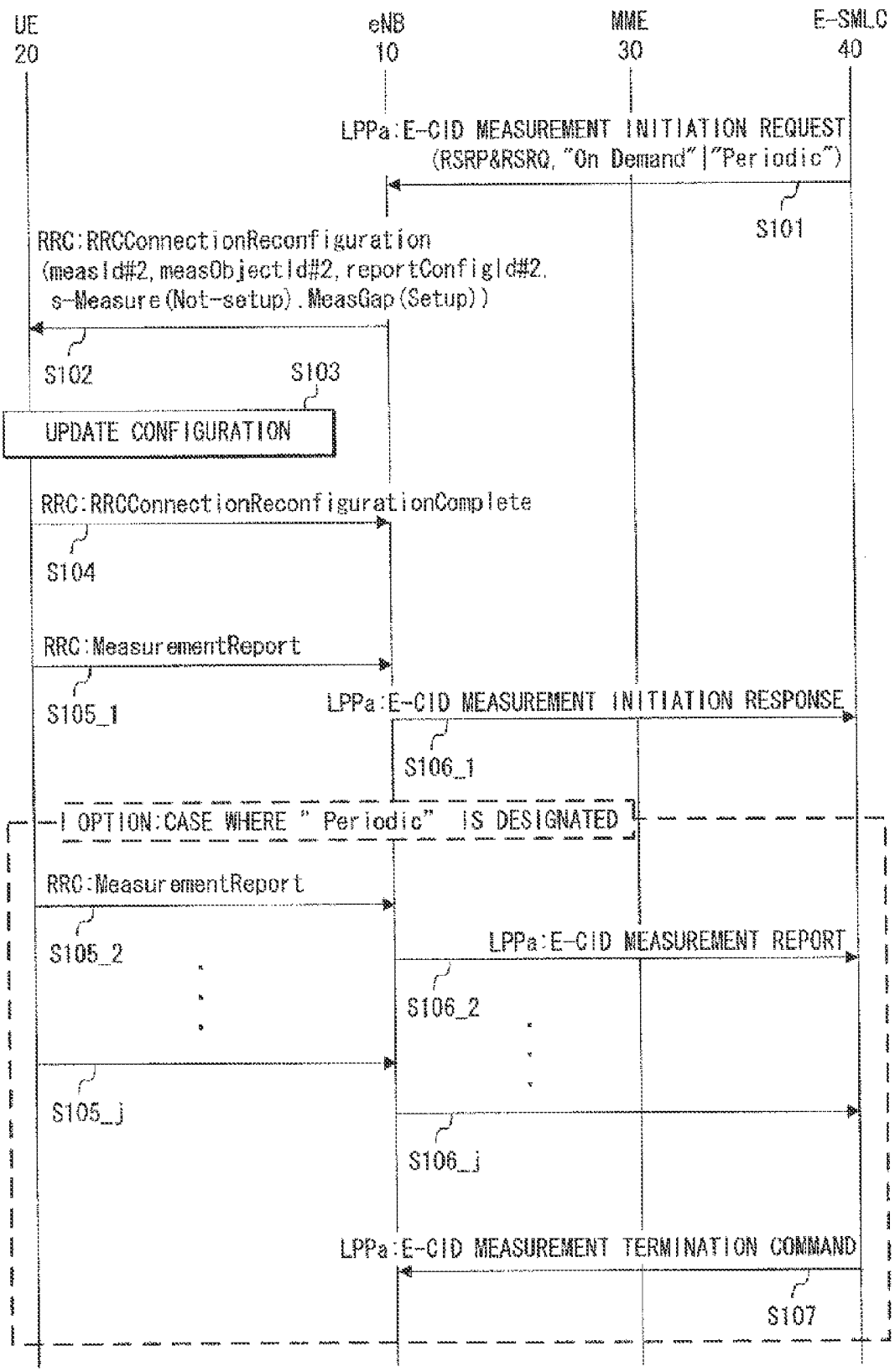
FIG. 17 is a sequence diagram showing an operation example of the typical mobile communication system that realizes the LCS.

Thus, in this exemplary embodiment, the LPPa:E-CID MEASUREMENT TERMINATION COMMAND message shown in FIG. 17 becomes unnecessary. This therefore improves utilization efficiency of wired resources. This exemplary advantage can be uniformly achieved regardless of the update in the s-Measure and the MeasGap.

Moreover, in a case where there is no update in either of the s-Measure and the MeasGap, it is not necessary to retransmit the RRCConnectionReconfiguration message, thereby enabling improvement in utilization efficiency of radio resources.

Second Exemplary Embodiment

A mobile communication system according to this exemplary embodiment can be configured in a similar manner as in FIGS. 15 and 16. Moreover, the eNB, the UE and the E-SMLC according to this exemplary embodiment, and the MME used in this exemplary embodiment can be configured in a similar manner as in the first exemplary embodiment.

Meanwhile, this exemplary embodiment is different from the above first exemplary embodiment in that the eNB 10, the UE 20, and the E-SMLC 40 operate as shown in FIGS. 7 and 8A to 8C.

Figure 7:
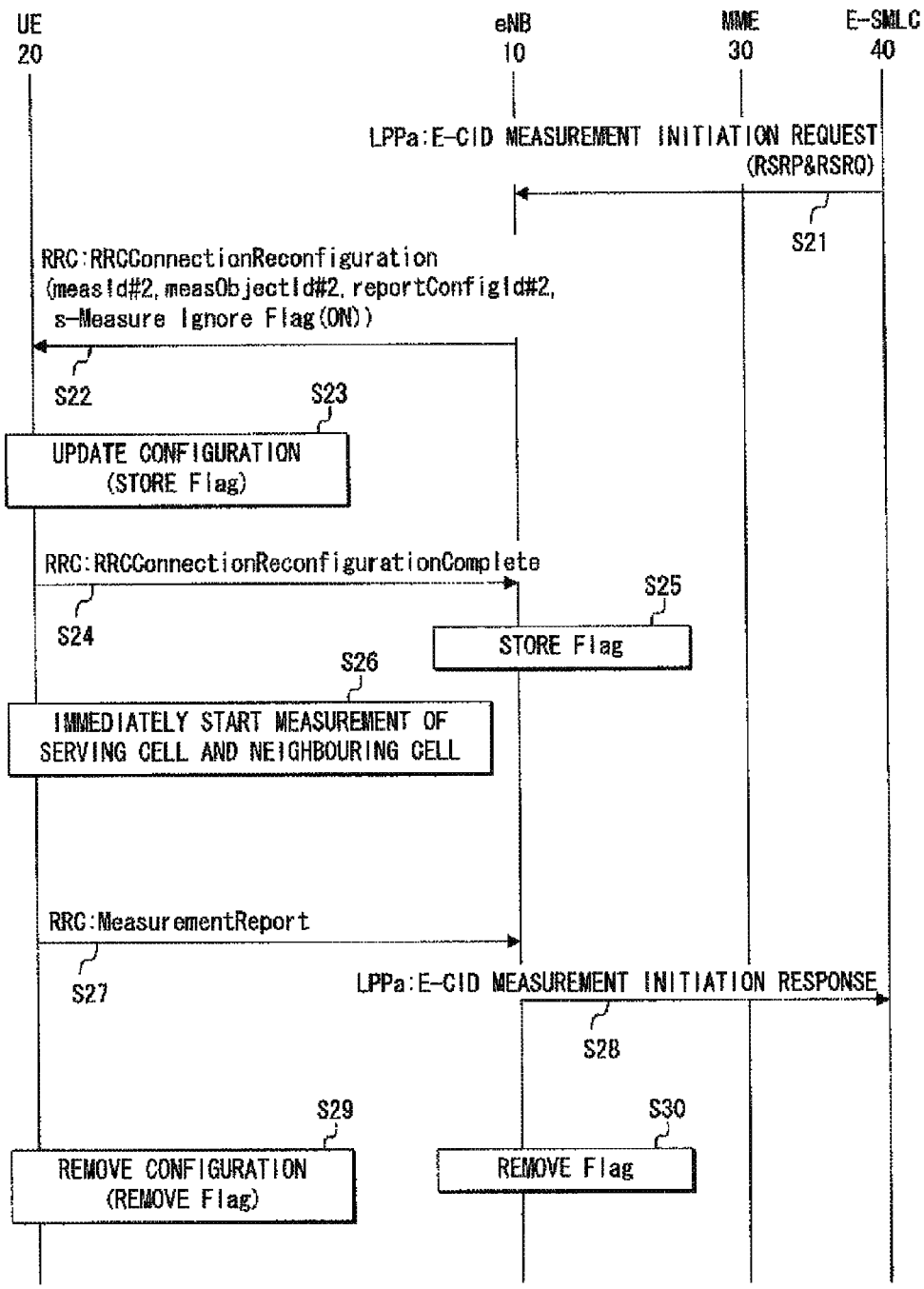
FIG. 7 is a sequence diagram showing an operation example of a mobile communication system according to the second exemplary embodiment of the present invention.

Specifically, as shown in FIG. 7, the E-SMLC 40 firstly transmits the LLPa:E-CID MEASUREMENT INITIATION REQUEST to the eNB 10 through the MME 30 (step S21).

In a similar manner as the above first exemplary embodiment, both RSRP and RSRQ are requested in the E-CID MEASUREMENT INITIATION REQUEST message as necessary information for calculating the geographical location and direction of the UE 20 (however, either RSRP or RSRQ may be requested as well).

On the other hand, unlike the above first exemplary embodiment, the number of reports N is not designated (however, the abovementioned "On Demand" or "Periodic" may be designated).

Then, the eNB 10 transmits the RRC:RRCConnectionReconfiguration to the UE 20, thereby instructing the UE 20 to report the necessary information (step S22).

In a similar manner as the above first exemplary embodiment, certain measObjectId#2 and reportConfigId#2, and measId#2 that associates them are included in the RRCConnectionReconfiguration message. Meanwhile, in this exemplary embodiment, these Ids shall instruct the UE 20 to perform measurement of the Intra-Freq neighbouring cell 51 in addition to measurement of the serving cell 50.

On the other hand, unlike the above first exemplary embodiment, s-Measure Ignore Flag is further included in the RRCConnectionReconfiguration message. This s-Measure Ignore Flag, when being set to "ON", instructs the UE 20 to immediately perform measurement of the neighbouring cell with the matching measId#2 regardless of the threshold of the s-Measure.

Note that when the s-Measure Ignore Flag is set to "OFF", the UE 20 determines whether or not to perform measurement of the neighbouring cell using the threshold of the s-Measure. This guarantees compatibility with the typical Uplink E-CID Positioning Procedure.

Then, the UE 20 updates its own configuration in accordance with contents of the received RRCConnectionReconfiguration message (step S23). Assume that configuration information as shown in FIG. 8A is stored to the memory in the UE 20 before the above step S22. In this case, as shown in FIG. 8B, the UE 20 adds the measId#2, the measObjectId#2 and the reportConfigId#2 to the memory. Further, the UE 20 stores to the memory the s-Measure Ignore Flag in association with the measId#2.

After that, the UE 20 transmits to the eNB 10 the RRC:RRCConnectionReconfigurationComplete message (step S24). In response to receive it, the eNB 10 stores the s-Measure Ignore Flag to an internal memory (not shown) and the like (step S25).

Moreover, the UE 20 immediately starts measurement of the serving cell and the neighbouring cell in accordance with the configuration information updated at the above step S23 (step S26). Next, the UE 20 sets measurement results to the RRC:MeasurementReport message to be reported to the eNB 10 (step S27).

Subsequently, the eNB 10 sets the measurement results reported from the UE 20 to the LPPa:E-CID MEASUREMENT INITIATION RESPONSE message to be notified to the E-SMLC 40 through the MME 30 (step S28).

Figure 8C:
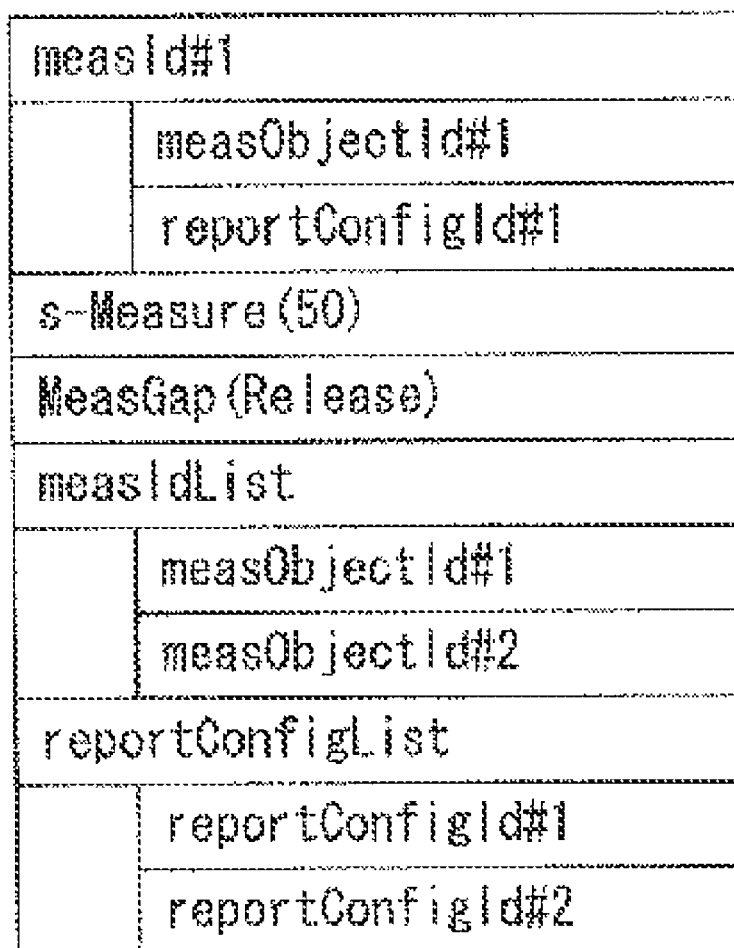
FIG. 8C shows a second example of updating the configuration information in the user equipment according to the second exemplary embodiment of the present invention.

Moreover, after the measurement is completed, the UE 20 autonomously performs the configuration removal (step S29). Specifically, as shown in FIG. 8C, the UE 20 removes the measId#2 (together with the measObjectId#2 and the reportConfigId#2 that are stored in association with the measId#2), and removes the s-Measure Ignore Flag from the memory.

On the other hand, the eNB 10 removes the internally stored s-Measure Ignore Flag after the notification is completed (step S30).

Thus, in this exemplary embodiment, the measurement result of the neighbouring cell can be acquired without updating the s-Measure. This eliminates the need for retransmission of the RRCConnectionReconfiguration message in an attempt for the configuration removal of the s-Measure, thereby improving the utilization efficiency of the radio resources.

Third Exemplary Embodiment

A mobile communication system according to this exemplary embodiment can be configured in a similar manner as in FIGS. 15 and 16. Moreover, the eNB, the UE and the E-SMLC according to this exemplary embodiment, and the MME used in this exemplary embodiment can be configured in a similar manner as in the first exemplary embodiment.

Meanwhile, this exemplary embodiment is different from the above first and second exemplary embodiments in that the eNB 10 and the UE 20 operate as shown in FIGS. 9 and 10A to 10C.

Figure 9:
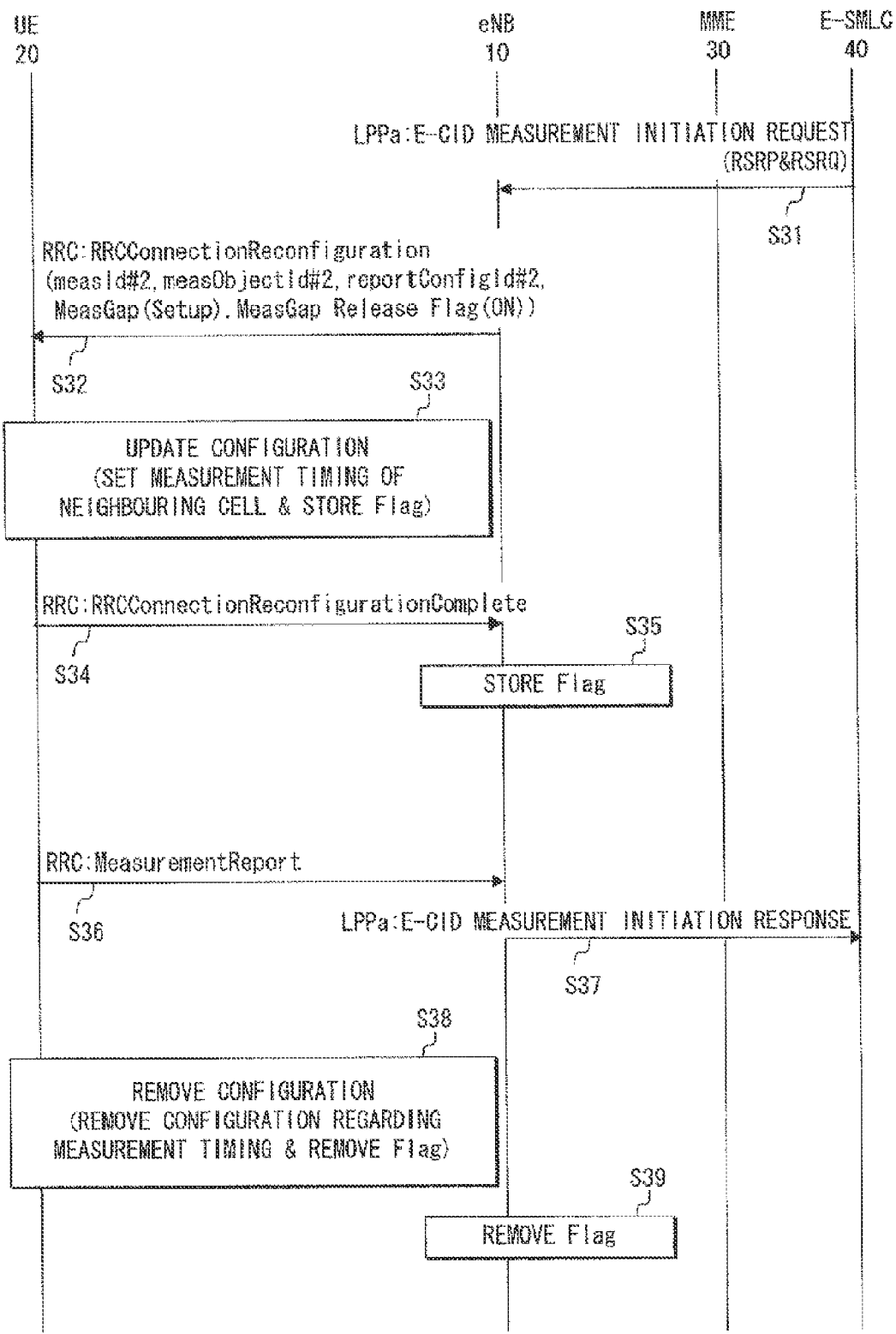
FIG. 9 is a sequence diagram showing an operation example of a mobile communication system according to the third exemplary embodiment of the present invention.

Specifically, as shown in FIG. 9, the E-SMLC 40 firstly transmits the LLPa:E-CID MEASUREMENT INITIATION REQUEST to the eNB 10 through the MME 30 (step S31). The E-CID MEASUREMENT INITIATION REQUEST message is set in a similar manner as the second exemplary embodiment.

Then, the eNB 10 transmits the RRC:RRCConnectionReconfiguration to the UE 20, thereby instructing the UE 20 to report the necessary information (step S32).

In a similar manner as the above first and second exemplary embodiments, certain measObjectId#2 and reportConfigId#2, and measId#2 that associates them are included in the RRCConnectionReconfiguration message. Meanwhile, in this exemplary embodiment, these Ids shall instruct the UE 20 to perform measurement of at least one of the Inter-Freq neighbouring cell 52 and the Inter-RAT neighbouring cell 53 in addition to the measurement of the serving cell 50.

On the other hand, unlike the above first and second exemplary embodiments, the MeasGap (Setup) and MeasGap Release Flag are further included in the RRCConnectionReconfiguration message. This MeasGap Release Flag, when being set to "ON", instructs the UE 20 to update the MeasGap to "Release" upon completion of the measurement of the neighbouring cell with the matching measId#2.

Note that when the MeasGap Release Flag is set to "OFF", the UE 20 continues to operate in accordance with the configuration of the MeasGap. This guarantees the compatibility with the typical Uplink E-CID Positioning Procedure.

Then, the UE 20 updates its own configuration in according with contents of the received RRCConnectionReconfiguration message (step S33). Assume that configuration information as shown in FIG. 10A is stored to the memory in the UE 20 before the above step S32. In this case, as shown in FIG. 10B, the UE 20 adds the measId#2, the measObjectId#2 and the reportConfigId#2 to the memory, and updates the MeasGap to "Setup". Further, the UE 20 stores to the memory the MeasGap Release Flag in association with the measId#2.

After that, the UE 20 transmits to the eNB 10 the RRC:RRCConnectionReconfigurationComplete message (step S34). In response to receive it, the eNB 10 stores the MeasGap Release Flag to the internal memory (not shown) and the like (step S35).

Moreover, the UE 20 starts measurement of the serving cell and the neighbouring cell in accordance with the configuration information updated at the abovementioned step S23. Next, the UE 20 sets measurement results to the RRC:MeasurementReport message to be reported to the eNB 10 (step S36).

Subsequently, the eNB 10 sets the measurement results reported from the UE 20 to the LPPa:E-CID MEASUREMENT INITIATION RESPONSE message to be notified to the E-SMLC 40 through the MME 30 (step S37).

Moreover, after the measurement is completed, the UE 20 autonomously performs the configuration removal (step S38). Specifically, as shown in FIG. 10C, the UE 20 removes the measId#2 (together with the measObjectId#2 and the reportConfigId#2 that are stored in association with the measId#2), and removes the s-Measure Ignore Flag from the memory. Further, the UE 20 updates the MeasGap to "Release".

On the other hand, after the notification is completed, the eNB 10 removes the internally stored MeasGap Release Flag (step S39).

Thus, in this exemplary embodiment, the configuration removal of the MeasGap can be performed without retransmitting the RRCConnectionReconfiguration message in the case of acquiring the measurement results of the Inter-Freq neighbouring cell and the Inter-RAT neighbouring cell. This improves the utilization efficiency of the radio resources.

Moreover, the MeasGap Release Flag can also be used as shown in the following modification.

Modification

Figure 11:
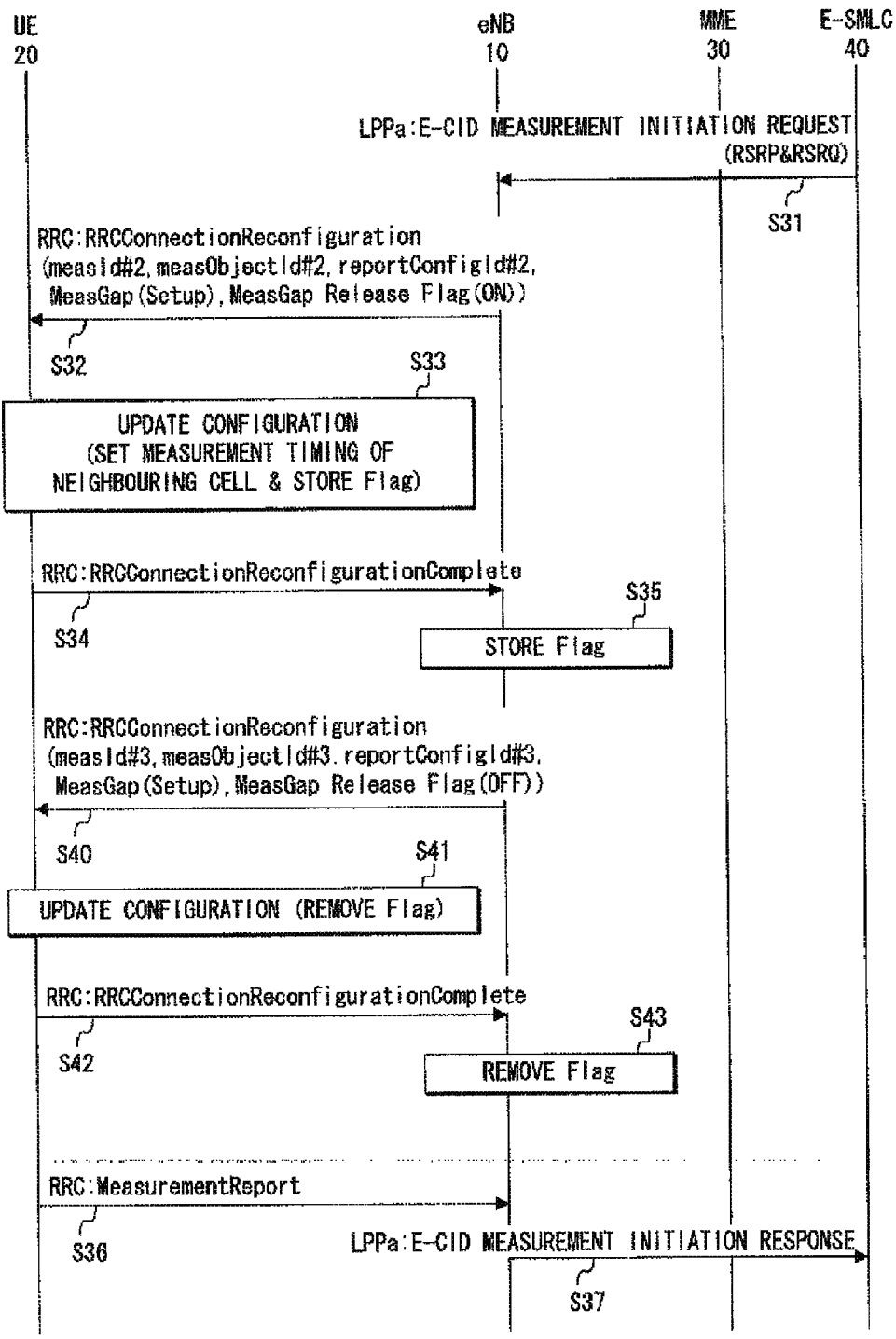
FIG. 11 is a sequence diagram showing an operation example of a mobile communication system according to a modification of the third exemplary embodiment of the present invention.

In this modification, the eNB 10 and the UE 20 corporate, thereby executing processes shown at steps S40 to S43 in FIG. 11 as substitutes for the processes shown at the above steps S28 to S39 in FIG. 9.

Specifically, suppose that it becomes the situation that is preferable to continue measuring the Inter-Freq neighbouring cell and the Inter-RAT neighbouring cell for e.g., handover while the eNB 10 waits for the RRC:MeasurementReport message from the UE 20.

In this case, the eNB 10 transmits to the UE 20 the RRC: RRCConnectionReconfiguration with the MeasGap Release Flag being set to "OFF" (step S40).

The reason for setting the MeasGap (Setup) again in the RRCConnectionReconfiguration message shown in FIG. 11 is to prevent the UE 20 from updating the MeasGap to "Release" before receiving the RRCConnectionReconfiguration message due to the RRCConnectionReconfiguration message and the MeasurementReport message crossing with each other. Note that in the example shown in FIG. 11, certain measObjectId#3 and reportConfigId#3, and measId#3 that associates them are included in the RRCConnectionReconfiguration message.

Then, the UE 20 updates its own configuration in accordance with contents of the received RRCConnectionReconfiguration message (step S41). Specifically, assume that as a result of the processes at the above steps S32 to S34, the configuration information in the memory of the UE 20 is updated from the state shown in FIG. 12A to the state shown in FIG. 12B. In this case, as shown in FIG. 12C, the UE 20 adds the measId#3, the measObjectId#3, and the reportConfigId#3 to the memory. Moreover, the UE 20 removes the MeasGap Release Flag from the memory while maintaining the MeasGap to "Setup".

After that, the UE 20 transmits to the eNB 10 the RRC: RRCConnectionReconfigurationComplete message (step S42). In response to receive it, the eNB 10 removes the MeasGap Release Flag from the internal memory and the like (step S43).

Then, after the process at the above step S36 (transmission of Measurement Report), the MeasGap (Setup) remains recorded on the memory in the UE 20. Therefore, the UE 20 can continue the measurement of the Inter-Freq neighbouring cell and the Inter-RAT neighbouring cell.

Fourth Exemplary Embodiment

A mobile communication system according to this exemplary embodiment can be configured in a similar manner as in FIGS. 15 and 16. Moreover, the eNB, the UE and the E-SMLC according to this exemplary embodiment, and the MME used in this exemplary embodiment can be configured in a similar manner as in the first exemplary embodiment.

Meanwhile, this exemplary embodiment is different from the above first exemplary embodiment in that the eNB 10 and the UE 20 operate as shown in FIGS. 13 and 14A to 14C. In other words, this exemplary embodiment is made in combination of the above first to third exemplary embodiments, and capable of improving both the utilization efficiency of the wired resources and the utilization efficiency of the radio resources by a cooperation operation of the eNB 10, the UE 20, and the E-SMLC 40.

Note that although the explanation is omitted, a combination of the above first and second exemplary embodiments and a combination of the above first and third exemplary embodiments can also improve both the utilization efficiency of the wired resources and the utilization efficiency of the radio resources.

Hereinafter, an operation of this exemplary embodiment will be described in detail with reference to FIGS. 13 and 14A to 14C.

Figure 13:
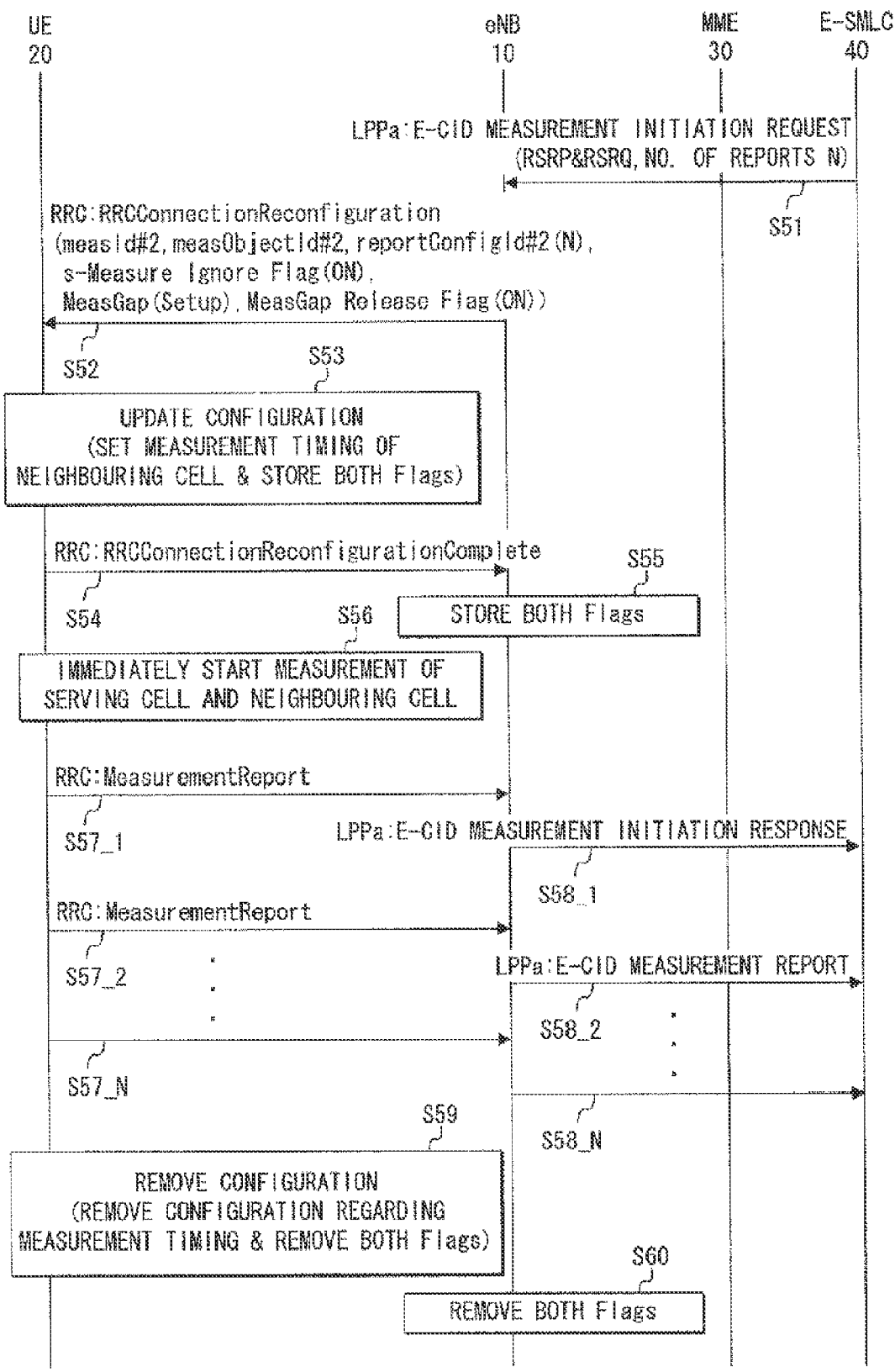
FIG. 13 is a sequence diagram showing an operation example of a mobile communication system according to the fourth exemplary embodiment of the present invention.

As shown in FIG. 13, the E-SMLC 40 firstly transmits the LLPa:E-CID MEASUREMENT INITIATION REQUEST to the eNB 10 through the MME 30 (step S51).

In a similar manner as the above first exemplary embodiment, in the E-CID MEASUREMENT INITIATION REQUEST message, both RSRP and RSRQ are requested as the necessary information for calculating the geographical location and direction of the UE 20, and the number of reports N for the UE 20 to be supposed to report the necessary information is designated.

Subsequently, the eNB 10 transmits to the UE 20 the RRC: RRCConnectionReconfiguration, thereby instructing the UE 20 to report the necessary information (step S52).

Certain measObjectId#2 and reportConfigId#2, and measId#2 that associates them are included in the RRCConnectionReconfiguration message. The number of reports N is indicated to the UE 20 by the reportConfigId#2 in a similar manner as the first exemplary embodiment.

In this exemplary embodiment, these Ids can instruct the UE 20 to perform measurement of all of the serving cell 50, the Intra-Freq neighbouring cell 51, the Inter-Freq neighbouring cell 52, and the Inter-RAT neighbouring cell 53.

Moreover, in a similar manner as the above second exemplary embodiment, the s-Measure Ignore Flag is included in the RRCConnectionReconfiguration message.

Further, in a similar manner as the above third exemplary embodiment, the MeasGap (Setup) and the MeasGap Release Flag are included in the RRCConnectionReconfiguration message.

Then, the UE 20 updates its own configuration in accordance with contents of the received RRCConnectionReconfiguration message (step S53). Assume that configuration information as shown in FIG. 14A is stored to the memory in the UE 20 before the above step S52. In this case, as shown in FIG. 14B, the UE 20 adds the measId#2, the measObjectId#2, and the reportConfigId#2 to the memory. In addition, the UE 20 stores to the memory the s-Measure Ignore Flag in association with the measId#2. Further, the UE 20 updates the MeasGap to "Setup", and stores to the memory the MeasGap Release Flag in association with the measId#2.

After that, the UE 20 transmits to the eNB 10 the RRC: RRCConnectionReconfigurationComplete message (step S54). In response to receive it, the eNB 10 stores the s-Measure Ignore Flag and the MeasGap Release Flag to the internal memory (not shown) and the like (step S55).

Further, the UE 20 immediately starts measurement of the serving cell and the neighbouring cell in accordance with the configuration information updated at the abovementioned step S53 (step S56). Subsequently, the UE 20 sets the measurement result to the RRC:MeasurementReport message to be reported to the eNB 10 (step S57_1).

Then, the eNB 10 sets the measurement result reported from the UE 20 to the LPPa:E-CID MEASUREMENT INITIATION RESPONSE message to be notified to the E-SMLC 40 through the MME 30 (step S58_1).

Moreover, the UE 20 repeats the measurement till the number of reports N, sets measurement results to MeasurementReport messages to be sequentially reported to the eNB 10 (steps S57_2 to S57_N).

On the other hand, the eNB 10 sets the measurement results from the UE 20 to LPPa:E-CID MEASUREMENT REPORT messages to be sequentially notified to the E-SMLC 40 through the MME 30 (steps S58_2 to S58_N).

After the measurement for the number of reports N is completed, the UE 20 autonomously performs the configuration removal (step S59). Specifically, as shown in FIG. 14C, the UE 20 removes from the memory the measId#2 (together with the measObjectId#2 and the reportConfigId#2 that are stored in association with the measId#2), the s-Measure Ignore Flag and the MeasGap Release Flag. Further, the UE 20 updates the MeasGap to "Release".

On the other hand, after the notification for the number of reports N is completed, the eNB 10 removes the internally stored s-Measure Ignore Flag and MeasGap Release Flag, and autonomously completes a response to the E-CID MEASUREMENT INITIATION REQUEST message (step S60).

Thus, in a similar manner as the first exemplary embodiment, the LPPa:E-CID MEASUREMENT TERMINATION COMMAND message shown in FIG. 17 becomes unnecessary in this exemplary embodiment.

Moreover, in a similar manner as the above second exemplary embodiment, the measurement result of the neighbouring cell can be acquired without updating the s-Measure. Therefore, it is not necessary to retransmit the RRCConnectionReconfiguration message.

In addition, in a similar manner as the above third exemplary embodiment, the configuration removal of the MeasGap can be performed without retransmitting the RRCConnectionReconfiguration message in the case of acquiring the measurement results of the Inter-Freq neighbouring cell and the Inter-RAT neighbouring cell.

Accordingly, this exemplary embodiment can improve both the utilization efficiency of the wired resources and the utilization efficiency of the radio resources.

Note that it is obvious that the present invention is not limited to the above exemplary embodiments, but may be variously changed by a person skilled in the art based on recitation in claims.

This application claims the benefit of priority, and incorporates herein by reference in its entirety, the following Japanese Patent Application No. 2010-188546 filed on Aug. 25, 2010.

INDUSTRIAL APPLICABILITY

The present invention is applied to a base station, a service providing device, a user equipment, a mobile communication system, and a communication control method therefor, and particularly to a usage to acquire a reception status of a radio signal at a user equipment upon providing LCS.

The whole or part of the exemplary embodiments disclosed above can be described as, but not limited to, the following supplementary notes.

(Supplementary Note 1)
A base station comprising:
first communication means for wirelessly communicating with a user equipment;
second communication means for communicating with a service providing device that provides a service corresponding to a location of the user equipment; and
control means for controlling the first and second communication means,
wherein the control means is configured to:
in response to one request from the service providing device, instruct the user equipment to perform first measurement on a reception status of a radio signal from the own base station, and indicate to the user equipment a number of reports for the user equipment to report a result of the first measurement, the number of reports being requested by the service providing device;
sequentially notify the service providing device of the result of the first measurement reported from the user equipment for the number of reports: and
autonomously complete a response to the one request when the notification is performed for the number of reports.

(Supplementary Note 2)
The base station according to Supplementary note 1,
wherein the control means is configured to:
further instruct, in response to the one request, the user equipment to report a result of second measurement on a reception status of a radio signal from a different base station disposed adjacent to the own base station for the number of reports; and
sequentially notify the service providing device of the results of the first and second measurement reported from the user equipment for the number of reports.

(Supplementary Note 3)
The base station according to Supplementary note 2, wherein the control means is configured to further instruct, in response to the one request, the user equipment to perform the second measurement regardless of a predetermined condition for measurement.

(Supplementary Note 4)
The base station according to Supplementary note 2 or 3, wherein the control means is configured to:
select, in response to the one request, as the different base station a base station that uses a radio frequency different from the own base station or to which a radio access technology different from the own base station is applied;
indicate to the user equipment a timing for the user equipment to perform the second measurement; and
instruct the user equipment to disable configuration regarding the timing upon completion of the second measurement.

(Supplementary Note 5)
The base station according to Supplementary note 4, wherein the control means is configured to further instruct, while waiting for the report, the user equipment not to disable the configuration even upon the completion of the second measurement.

(Supplementary Note 6)
A base station comprising:
first communication means for wirelessly communicating with a user equipment;
second communication means for communicating with a service providing device that provides a service corresponding to a location of the user equipment; and
control means for controlling the first and second communication means, wherein the control means is configured to:

instruct, in response to a request from the service providing device, the user equipment to perform measurement on a reception status of a radio signal from a different base station disposed adjacent to the own base station regardless of a predetermined condition for measurement; and notify the service providing device of a result of the measurement reported from the user equipment.

(Supplementary Note 7)

The base station according to any one of Supplementary notes 2, 3 and 6, wherein the control means is configured to select, as the different base station, a first base station that uses a same radio frequency as the own base station, a second base station that uses a radio frequency different from the own base station, or a third base station to which wireless access technology different from the own base station is applied.

(Supplementary Note 8)

The base station according to Supplementary note 7, wherein the control means is configured to select, as the second or third base station, a base station whose coverage of a cell includes coverage of a cell formed by the own base station.

(Supplementary Note 9)

A base station comprising:

first communication means for wirelessly communicating with a user equipment;

second communication means for communicating with a service providing device that provides a service corresponding to a location of the user equipment; and control means for controlling the first and second communication means, wherein the control means is configured to:

in response to a request from the service providing device, instruct the user equipment to perform measurement on a reception status of a radio signal from a different base station that is disposed adjacent to the own base station, and that uses a radio frequency different from the own base station or to which radio access technology different from the own base station is applied, indicate to the user equipment a timing for the user equipment to perform the measurement, and instruct the user equipment to disable configuration regarding the timing upon completion of second measurement; and notify a result of the measurement reported from the user equipment to the service providing device.

(Supplementary Note 10)

The base station according to Supplementary note 9, wherein the control means is configured to further instruct, while waiting for the report, the user equipment not to disable the configuration even upon the completion of the measurement.

(Supplementary Note 11)

The base station according to any one of Supplementary notes 4, 5, 9, and 10, wherein the control means is configured to select, as the different base station, a base station whose coverage of a cell includes coverage of a cell formed by the own base station.

(Supplementary Note 12)

A service providing device comprising:

communication means for communicating with a base station; and control means for controlling the communication means to provide a service corresponding to a location of a user equipment attaching to the base station, wherein the control means is configured to:

request the base station to notify a result of measurement on a reception status at the user equipment of a radio signal at least from the base station for a predetermined number of times; and evaluate that a response to the request is completed by the base station when the notification is performed for the number of times, and calculate the location using the result of the measurement.

(Supplementary Note 13)

The service providing device according to Supplementary note 12, wherein the control means is configured to further receive, as the result of the measurement, a result of measurement on a reception status of a radio signal from a different base station that is disposed adjacent to the base station.

(Supplementary Note 14)

A user equipment comprising:

communication means for wirelessly communicating with a base station; and control means for controlling the communication means, wherein the control means is configured to:

perform, in response to an instruction from the base station, measurement on a reception status of a radio signal at least from the base station for a number of times indicated by the base station; and sequentially report a result of the measurement to the base station for the number of times.

(Supplementary Note 15)

The user equipment according to Supplementary note 14, wherein the control means is configured to further perform, in response to the instruction, measurement on a reception status of a radio signal from a different base station that is disposed adjacent to the base station for the number of times, and sequentially report a result of the measurement to the base station.

(Supplementary Note 16)

A user equipment comprising:

communication means for wirelessly communicating with a base station; and control means for controlling the communication means, wherein the control means is configured to:

perform, in response to one instruction from the base station, measurement on a reception status of a radio signal from a different base station disposed adjacent to the base station regardless of a predetermined condition for measurement; and report a result of the measurement to the base station.

(Supplementary Note 17)

A user equipment comprising:

communication means for wirelessly communicating with a base station; and control means for controlling the communication means, wherein the control means is configured to:

perform, in response to one instruction from the base station, measurement on a reception status of a radio signal from a different base station that is disposed adjacent to the base station, and that uses a radio frequency different from the base station or to which radio access technology different from the base station is applied at a timing indicated by the base station, and disable configuration regarding the timing upon completion of the measurement; and notify the base station of a result of the measurement.

(Supplementary Note 18)

The user equipment according to Supplementary note 17, wherein the control means is configured to continue measurement in accordance with the configuration when the control means is instructed by the base station not to disable the configuration even upon the completion of the measurement before reporting.

(Supplementary Note 19)

A mobile communication system comprising:

a base station;

a user equipment that wirelessly communicates with the base station; and a service providing device that communicates with the base station to provide a service corresponding to a location of the user equipment, wherein the service providing device requests the base station to notify a result of measurement on a reception status at the user equipment of a radio signal at least from the base station for a predetermined number of times, and calculates the location using the result of the measurement when the notification is performed for the number of times, the base station instructs, in response to the request, the user equipment to perform the measurement for the number of times and sequentially notifies the service providing device of the result of the measurement reported from the user equipment for the number of times, and the user equipment performs, in response to the instruction, the measurement on the reception status for the number of times and sequentially notifies the base station of the result of the measurement for the number of times.

(Supplementary Note 20)

A mobile communication system comprising:

a base station;

a user equipment that wirelessly communicates with the base station; and a service providing device that communicates with the base station to provide a service corresponding to a location of the user equipment, wherein the base station instructs, in response to a request from the service providing device, the user equipment to perform measurement on a reception status of a radio signal from a different base station disposed adjacent to the base station regardless of a predetermined condition for measurement, and notifies the service providing device of a result of the measurement reported from the user equipment, the user equipment performs, in response to the instruction, the measurement on the reception status regardless of the condition for measurement and reports the result of the measurement to the base station, and the service providing device calculates the location using the result of the measurement.

(Supplementary Note 21)

A mobile communication system comprising:

a base station;

a user equipment that wirelessly communicates with the base station; and a service providing device that communicates with the base station to provide a service corresponding to a location of the user equipment, wherein the base station instructs, in response to a request from the service providing device, the user equipment to perform measurement on a reception status of a radio signal from a different base station that is disposed adjacent to the base station, and that uses a radio frequency different from the base station or to which radio access technology different from the base station is applied, indicates to the user equipment a timing for the user equipment to perform the measurement, instructs the user equipment to disable configuration regarding the timing upon completion of the measurement, and notifies the service providing device of a result of the measurement reported from the user equipment, the user equipment performs, in response to the instruction, the measurement on the reception timing at the timing, disables the configuration regarding the timing upon the completion of the measurement, and reports the result of the measurement to the base station, and the service providing device calculates the location using the result of the measurement.

(Supplementary Note 22)

A method of controlling communication in a base station that wirelessly communicates with a user equipment and that communicates with a service providing device for providing a service corresponding to a location of the user equipment, the method comprising:

instructing, in response to one request from the service providing device, the user equipment to perform measurement on a reception status of a radio signal from the base station, and indicating to the user equipment a number of reports for the user equipment to report a result of the measurement, the number of reports being requested by the service providing device;

sequentially notifying the service providing device of the result of the measurement reported from the user equipment for the number of reports; and autonomously completing a response to the request when the notification is performed for the number of reports.

(Supplementary Note 23)

A method of controlling communication in a base station that wirelessly communicates with a user equipment and that communicates with a service providing device for providing a service corresponding to a location of the user equipment, the method comprising:

instructing, in response to a request from the service providing device, the user equipment to perform measurement on a reception status of a radio signal from a different base station disposed adjacent to the base station regardless of a predetermined condition for measurement; and notifying the service providing device of a result of the measurement reported from the user equipment.

(Supplementary Note 24)

A method of controlling communication in a base station that wirelessly communicates with a user equipment and that communicates with a service providing device for providing a service corresponding to a location of the user equipment, the method comprising:

instructing, in response to a request from the service providing device, the user equipment to perform measurement on a reception status of a radio signal from a different base station that is disposed adjacent to the base station, and that uses a radio frequency different from the base station or to which radio access technology different from the base station is applied, indicating to the user equipment a timing for the user equipment to perform the measurement, and instructing the user equipment to disable configuration regarding the timing upon completion of the measurement; and notifying the service providing device of a result of the measurement reported from the user equipment.

(Supplementary Note 25)

A method of controlling communication in a service providing device that communicates with a base station to provide a service corresponding to a location of a user equipment attaching to the base station, the method comprising:

requesting the base station to notify a result of measurement on a reception status at the user equipment of a radio signal at least from the base station for a predetermined number of times; and evaluating that a response to the request is completed by the base station when the notification is performed for the number of times, and calculating the location using the result of the measurement.

(Supplementary Note 26)

A method of controlling communication in a user equipment that wirelessly communicates with a base station, the method comprising:

performing, in response to an instruction from the base station, measurement on a reception status of a radio signal at least from the base station for a number of times indicated by the base station; and sequentially notifying the base station of a result of the measurement for the number of times.

(Supplementary Note 27)

A method of controlling communication in a user equipment that wirelessly communicates with a base station, the method comprising:

performing, in response to one instruction from the base station, measurement on a reception status of a radio signal from a different base station disposed adjacent to the base station regardless of a predetermined condition for measurement; and reporting a result of the measurement to the base station.

(Supplementary Note 28)

A method of controlling communication in a user equipment that wirelessly communicates with a base station, the method comprising:

performing, in response to one instruction from the base station, measurement on a reception status of a radio signal from a different base station that is disposed adjacent to the base station, and that uses a radio frequency different from the base station or to which radio access technology different from the base station is applied at a timing indicated by the base station, and disabling configuration regarding the timing upon completion of the measurement; and reporting a result of the measurement to the base station.

REFERENCE SIGNS LIST

10, 10_1-10_i eNB
11, 21 Uu TRANSCEIVING UNIT
12, 31 S1 TRANSCEIVING UNIT
13, 22, 33, 42 CONTROL UNIT
20 UE
30 MME
32, 41 SLs TRANSCEIVING UNIT
40 E-SMLC
50 SERVING CELL
51 Intra-Freq NEIGHBOURING CELL
52, 52A, 52B Inter-Freq NEIGHBOURING CELL
53, 53A, 53B Inter-RAT NEIGHBOURING CELL
131, 221 RRC LAYER
132, 331 S1-AP LAYER
133, 422 LPPa LAYER
134, 222, 333, 423 CONTROLLER
332, 421 LCS-AP LAYER

The invention claimed is:

1. A base station comprising:
a first communication unit that wirelessly communicates with a user equipment;
a second communication unit that communicates with a service providing device for providing a service corresponding to a location of the user equipment; and
a control unit that controls the first and second communication units,
wherein the control unit is configured to:
in response to one request from the service providing device, instruct the user equipment to perform a first measurement on a reception status of a radio signal from the own base station, and indicate to the user equipment a number of reports for the user equipment to report a result of the first measurement, the number of reports being requested by the service providing device;
further instruct, in response to the one request, the user equipment to report a result of a second measurement on a reception status of a radio signal from a first base station disposed adjacent to the own base station for the number of reports, and to perform the second measurement in accordance with a predetermined condition for measurement;
further instruct, in response to the one request, the user equipment to report a result of a third measurement on a reception status of a radio signal from a second base station disposed adjacent to the own base station for the number of reports, and to perform the third measurement regardless of the predetermined condition for measurement;
sequentially notify the service providing device of the result of the first measurement to the third measurement reported from the user equipment for the number of reports; and
autonomously complete a response to the one request when the notification is performed for the number of reports.

2. The base station according to claim 1,
wherein the control unit is further configured to:
select, in response to the one request, as each of the first and second base stations, a base station that uses a radio frequency different from the own base station or to which radio access technology different from the own base station is applied;
indicate to the user equipment a timing for the user equipment to perform each of the second and third measurements; and
instruct the user equipment to disable configuration regarding the timing upon completion of each of the second and third measurements.

3. The base station according to claim 2, wherein the control unit is further configured to further instruct, while waiting for the report, the user equipment not to disable the configuration even upon the completion of each of the second and third measurements.

4. The base station according to claim 2, wherein the control unit is further configured to select, as the different base station, a base station whose coverage of a cell includes coverage of a cell formed by the own base station.

5. The base station according to claim 1, wherein the control unit is configured to select, as each of the first and second base stations, an intra-frequency base station that uses a same radio frequency as the own base station, an inter-frequency base station that uses a radio frequency different from the own base station, or an inter-RAT (Radio Access Technology) base station to which wireless access technology different from the own base station is applied.

6. The base station according to claim 5, wherein the control unit is configured to select, as each of the inter-frequency base station and the inter-RAT base station, a base station whose coverage of a cell includes coverage of a cell formed by the own base station.

7. A user equipment comprising:
a communication unit that wirelessly communicates with a base station; and
a control unit that controls the communication unit, wherein the control unit is configured to:
perform, in response to an instruction from the base station, a first measurement on a reception status of a radio signal at least from the base station for a number of times indicated by the base station;
perform, in response to the instruction, a second measurement on a reception status of a radio signal from a first base station that is disposed adjacent to the base station for the number of times, and to perform the second measurement in accordance with a predetermined condition for measurement;
further perform, in response to the instruction, a third measurement on a reception status of a radio signal from a second base station disposed adjacent to the base station for the number of reports, and to perform the third measurement regardless of the predetermined condition for measurement; and
sequentially report the result of the first measurement to the third measurement to the base station for the number of times.

8. A base station comprising:
a first communication unit that wirelessly communicates with a user equipment;
a second communication unit that communicates with a service providing device for providing a service corresponding to a location of the user equipment; and
a control unit that controls the first and second communication units,
wherein the control unit is configured to:
  instruct, in response to a request from the service providing device, the user equipment to perform a first measurement on a reception status of a radio signal from a first base station disposed adjacent to the own base station, and to perform the first measurement in accordance with a predetermined condition for measurement;
  instruct, in response to the request, the user equipment to perform a second measurement on a reception status of a radio signal from a second base station disposed adjacent to the own base station, and to perform the second measurement regardless of the predetermined condition for measurement;
  notify the service providing device of the result of the first and second measurements reported from the user equipment.

9. A user equipment comprising:
a communication unit that wirelessly communicates with a base station; and
a control unit that controls the communication unit,
wherein the control unit is configured to:
  perform, in response to an instruction from the base station, a first measurement on a reception status of a radio signal from a first base station that is disposed adjacent to the base station, and to perform the first measurement in accordance with a predetermined condition for measurement;
  perform, in response to the instruction, a second measurement on a reception status of a radio signal from a second base station disposed adjacent to the base station, and to perform the second measurement regardless of the predetermined condition for measurement; and
  report the result of the first and second measurements to the base station.

* * * * *